United States Patent
Zinn et al.

(10) Patent No.: US 11,332,563 B2
(45) Date of Patent: May 17, 2022

(54) FAST DISSOLVING, WATER SOLUBLE, HYDROPHOBICALLY-MODIFIED POLYELECTROLYTES

(71) Applicant: Ecolab USA Inc., St. Paul, MN (US)

(72) Inventors: Paul Joseph Zinn, Oswego, IL (US); En-Wei Lin, Naperville, IL (US); Heinrich Enoch Bode, Aurora, IL (US); Mario Roberto Rojas, Fulshear, TX (US); Christopher Steven Popeney, Sugar Land, TX (US); Pious Kurian, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 192 days.

(21) Appl. No.: 16/523,730

(22) Filed: Jul. 26, 2019

(65) Prior Publication Data

US 2020/0031968 A1   Jan. 30, 2020

Related U.S. Application Data

(60) Provisional application No. 62/711,969, filed on Jul. 30, 2018.

(51) Int. Cl.
| | |
|---|---|
| C09K 8/68 | (2006.01) |
| C08F 220/56 | (2006.01) |
| C09K 8/12 | (2006.01) |
| C10G 71/00 | (2006.01) |

(52) U.S. Cl.
CPC .............. C08F 220/56 (2013.01); C09K 8/12 (2013.01); C10G 71/00 (2013.01); *C10G 2300/1033* (2013.01); *C10G 2300/302* (2013.01); *C10G 2300/80* (2013.01)

(58) Field of Classification Search
CPC ..... C08F 220/56; C09K 8/12; C09K 2208/28; C09K 8/68; C09K 8/882; C10G 71/00; C10G 2300/1033; C10G 2300/302; C10G 2300/80
See application file for complete search history.

(56) References Cited

U.S. PATENT DOCUMENTS

| | | | |
|---|---|---|---|
| 3,963,684 A | 6/1976 | Evani et al. | |
| 4,008,202 A * | 2/1977 | Evani .................. | C08G 65/32 526/289 |
| 4,025,484 A | 5/1977 | Evani et al. | |
| 4,029,872 A | 6/1977 | Evani et al. | |
| 4,029,873 A | 6/1977 | Evani et al. | |
| 4,029,874 A | 6/1977 | Evani et al. | |
| 4,038,265 A | 7/1977 | Evani et al. | |
| 4,080,304 A | 3/1978 | Smith | |
| 4,151,341 A | 4/1979 | Lalk et al. | |
| 4,330,414 A * | 5/1982 | Hoover .................. | C09K 8/035 507/114 |
| 4,528,348 A * | 7/1985 | Turner .................... | C09K 8/588 526/225 |
| 4,702,319 A | 10/1987 | Bock et al. | |
| 6,417,268 B1 | 7/2002 | Zhang et al. | |
| 7,081,439 B2 | 7/2006 | Sullivan et al. | |
| 9,228,123 B2 | 1/2016 | Song et al. | |
| 9,290,720 B2 | 3/2016 | Blondel | |
| 9,315,717 B2 | 4/2016 | Pfeuffer et al. | |
| 9,334,428 B2 | 5/2016 | Lewandowski et al. | |
| 2002/0004464 A1 | 1/2002 | Nelson et al. | |
| 2003/0022568 A1 | 1/2003 | Branham et al. | |
| 2007/0281869 A1 | 12/2007 | Drochon et al. | |
| 2008/0103248 A1 | 5/2008 | Suau et al. | |
| 2010/0009387 A1 | 1/2010 | Cheng | |
| 2010/0093874 A1 | 4/2010 | Monin et al. | |
| 2010/0331510 A1 | 12/2010 | Reichenbach-Klinke et al. | |
| 2011/0048716 A1 | 3/2011 | Ezell | |
| 2011/0223125 A1 | 9/2011 | Hough et al. | |
| 2012/0024529 A1 | 2/2012 | van Zanten et al. | |
| 2012/0125606 A1 | 5/2012 | Reichenbach-Klinke et al. | |
| 2012/0129734 A1 | 5/2012 | Reichenbach-Klinke et al. | |
| 2012/0132420 A1 | 5/2012 | Langlotz et al. | |
| 2012/0255731 A1 | 10/2012 | Reichenbach-Klinke et al. | |
| 2013/0274170 A1 | 10/2013 | Yuan-Huffman et al. | |
| 2014/0262293 A1 | 9/2014 | Song et al. | |
| 2014/0377553 A1 | 12/2014 | Clapper et al. | |
| 2015/0329660 A1 | 11/2015 | Bittner et al. | |
| 2015/0329669 A1 | 11/2015 | Bittner et al. | |
| 2016/0200963 A1 | 7/2016 | Reed et al. | |
| 2017/0101576 A1 | 4/2017 | Langlotz et al. | |

(Continued)

FOREIGN PATENT DOCUMENTS

| | | | |
|---|---|---|---|
| CA | 2818847 A1 | 5/2012 | |
| CN | 1178801 | * | 4/1998 |
| CN | 101284893 A | 10/2008 | |

(Continued)

OTHER PUBLICATIONS

Zhong (C. Zhong, et al.,"Association in Unsalted and Brine Solutions of a Water-Soluble Terpolymer with-Vinylbenzyl-Terminated Octylphenoxy Poly(ethylene oxide)", Journal of Solution Chemistry, vol. 40, 2111, 1735-1754).*

Candau, Francoise et al., Hydrophobically-modified polyacrylamides prepared by micellar polymerization, Advances in Colloid and Interface Science 79 (1999), pp. 149-172.

Chao, Dongri et al., Poly(ethylene oxide) Macromonomers IX. Synthesis and Polymerization of Macromonomers Carrying Styryl End Groups with Enhanced Hydrophobicity, Polymer Journal, vol. 23, No. 9, pp. 1045-1052 (1991).

Gouveia, Laura M. et al., The effect of the ionic strength on the rheological behavior of hydrophobically modified polyacrylamide aqueous solutions mixed with sodium dodecyl sulfate (SDS) or cetyltrimethylammonium p-toluenesulfonate (CTAT), Colloids and Surfaces A: Physicochemical and Engineering Aspects 322 (2008), pp. 211-218.

(Continued)

*Primary Examiner* — Kumar R Bhushan

(74) *Attorney, Agent, or Firm* — Stinson LLP

(57) ABSTRACT

Copolymers and compositions containing copolymers having advantageous viscosity, friction reduction, dissolution, pH-stability, and temperature-stability are provided. These copolymers can be used as rheology modifiers for oil field applications.

20 Claims, 3 Drawing Sheets

(56) References Cited

U.S. PATENT DOCUMENTS

2017/0362489 A1* 12/2017 Jackson ................ C09K 8/584

FOREIGN PATENT DOCUMENTS

| CN | 101392041 | A | 3/2009 |
|---|---|---|---|
| CN | 101463116 | * | 6/2009 |
| CN | 101463116 | A | 6/2009 |
| CN | 101475667 | A | 7/2009 |
| CN | 101475691 | A | 7/2009 |
| CN | 101486782 | A | 7/2009 |
| CN | 101492515 | A | 7/2009 |
| CN | 101543748 | B | 4/2011 |
| CN | 103554463 | A | 2/2014 |
| CN | 104311755 | A | 1/2015 |
| CN | 106479559 | A | 3/2017 |
| EP | 2457973 | A1 | 5/2012 |
| EP | 3 098 381 | A1 | 11/2016 |
| WO | 2012/061147 | A1 | 5/2012 |
| WO | 2012/069438 | A1 | 5/2012 |
| WO | 2012/069477 | A1 | 5/2012 |
| WO | 2012/136613 | A1 | 10/2012 |
| WO | 2016/034743 | A1 | 3/2016 |
| WO | 2016/083318 | A1 | 6/2016 |
| WO | 2016/207554 | A1 | 12/2016 |
| WO | 2017084379 | A1 | 5/2017 |

OTHER PUBLICATIONS

Hwang, F.S. et al., Effects of Water-Soluble Spacers on the Hydrophobic Association of Fluorocarbon-Modified Poly(acrylamide), Macromolecules 1995, 28, pp. 3328-3335.

Ito, Koichi et al., Poly(ethylene oxide) Macromonomers. 7. Micellar Polymerization in Water, Macromolecules 1991, 24, pp. 2348-2354.

Noda, Tetsuya et al., Effects of Spacer Length on the Side-Chain Micellization in Random Copolymers of Sodium 2-(Acrylamido)-2-methylpropanesulfonate and Methacrylates Substituted with Ethylene Oxide-Based Surfactant Moieties, Macromolecules 2001, 34, pp. 1308-1317.

Ming-Yu, Rao, et al., Synthesis and Solution Properties of Comb-Like Acrylamide Copolymers, Polymer Materials Science and Engineering, vol. 25, No. 5, May 2009, 4 pages.

Rogovina, Lidiya Z. et al., Hydrophobically Associating Water-Soluble Polymers: A Dramatic Growth of Solution Viscosity and the Specificity of Physical Gel Formation, Macromol. Symp. 171, pp. 225-232 (2001).

Varadaraj, Ramesh et al., Effect of Hydrocarbon Chain Branching on Interfacial Properties of Monodisperse Ethoxylated Alcohol Surfactants, Journal of Colloid and Interface Science, vol. 147, No. 2, Dec. 1991, pp. 387-395.

Zhong, Chuanrong et al., Rheological Behavior of an Acrylamide-based Terpolymer with p-Vinylbenzyl-terminated Octylphenoxy Poly(ethylene oxide), Polymer Science, Ser. A, 2012, vol. 54, No. 10, pp. 809-820 (2012).

Zhong, Chuanrong et al., Surface and Interface Properties and Associated Behavior in Water and Brine Solutions of an Acrylamide-Based Terpolymer with a Macromonomer, Journal of Macromolecular Science, Part B: Physics 52:2 pp. 383-397 (2013).

Zhong, Chuanrong et al., Viscosity Behavior and Associated Morphologies of a Branched Acrylamide-Based Terpolymer in Water and Brine Solutions, Chemical Engineering Communications, 202 (2015) pp. 475-483.

Dastan, Sareh et al., Hydrophobically associating terpolymers of acrylamide, alkyl acrylamide, and methacrylic acid as EOR thickeners, J Polym Res (2016) 23: 175, 18 pages.

Zhong, Chuanrong et al., Association in Unsalted and Brine Solutions of a Water-Soluble Terpolymer with p-Vinylbenzyl-Terminated Octylphenoxy Poly(ethyleneoxide), J. Solution Chem (2011) 40:1735-1754.

International Search Report and Written Opinion dated Sep. 27, 2019 relating to PCT Application No. PCT/US2019/043567, 17 pages.

* cited by examiner

FAST DISSOLVING, WATER SOLUBLE, HYDROPHOBICALLY-MODIFIED POLYELECTROLYTES

CROSS REFERENCE TO RELATED APPLICATIONS

This application claims priority to U.S. Provisional Patent Application Ser. No. 62/711,969 filed on Jul. 30, 2018, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Copolymers and compositions containing copolymers having advantageous viscosity, friction reduction, dissolution, pH-stability, and temperature-stability are provided. These copolymers and compositions containing these copolymers can be used as rheology modifiers for oil field applications.

BACKGROUND OF THE INVENTION

Fluids used in the oil and petroleum industry often need to have controlled increases in viscosity and/or friction reduction capability, but the high salinity, extreme temperatures and pH of these fluids often leads to the failure of traditional viscosifiers and friction reducers. Therefore, there is a need to develop properly viscosifying and friction reducing, high temperature/high pH tolerant synthetic polymers for high salinity (>100 k total dissolved solids (TDS) or >10 wt. %) oil field fluids, such as well stimulation fluids and water-based drilling muds (WBMs).

Common viscosifiers used in oil field fluids include xanthan gum or guar powder. Both of these are natural polymers that display fast viscosity development, ideal high low-end-rheology (high viscosity at low shear rates) and high gel strength while maintaining sufficient pseudo-plasticity (meaning they have plastic viscosities and yield points that are ideal for pumping). For WBMs, the desired rheological characteristics displayed by xanthan gum (0.5 wt % in brine) are low shear rate viscosities (5 and 10 s$^{-1}$) of 800-1000 cP and 500-600 cP, respectively, yield point values of 8-25 lb/100 ft$^2$ and plastic viscosity no higher than 30 cP in the target brines (>100k TDS) when measured at 150° F. These polymers are often used in fluids for well drilling (WBMs), well completion, proppant delivery, fracturing, and other applications. However, these polymers break down when subjected to high temperatures (200° F.) unless added with specialized crosslinkers, leaving residue behind after breaking the fluid which leads to undesired well conductivity, and have an unpredictable supply and cost. In addition, they are subject to biological (e.g., microbial) degradation.

To withstand the elevated temperatures found in the wellbore, synthetic polymers are often used. Suitable synthetic polymers include high molecular weight acrylamide/acrylate or acrylamide/ATBS copolymers. Synthetic polymers display superior thermal and biological resistance compared to natural polymers. An additional advantage is the "dual use" capability of synthetic polymers where they can function as both viscosifiers and friction reducers depending on their concentration within the fluid. Thus, they are beneficial to a wider range of fracturing methods compared to natural polymers. To provide the desired viscosity at high salinities (>30 k TDS), the synthetic polymers are modified using hydrophobic groups to form hydrophobically modified (HM) polyelectrolytes. The hydrophobic chains in HM polyelectrolytes form dynamic polymer networks via hydrophobic associations, leading to significantly higher viscosity compared to non-HM polyelectrolytes, particularly in high salinity fluids. However, oil based lubricants typically used in water based drilling mud formulations and oil contamination in well stimulation fluids have been found to interfere with the hydrophobic associations responsible for producing the dynamic polymer network. In addition, higher pH fluids can quickly hydrolyze the typically used ester-derived linkage of the hydrophobe to the polelectrolyte backbone, permanently removing the capability of the HM polyelectrolyte to form the dynamic polymer network necessary for the desired viscosity. Furthermore, HM polyelectrolytes are typically very slow to dissolve in aqueous solutions, especially in brines, making their use impractical in situations when viscosity must be increased rapidly and efficiently, such as in proppant transport during hydraulic fracturing. Typically, surfactants are added during the dissolution step to aid in dispersing the hydrophobic groups, and even with this added surfactant, the dissolution process often takes hours, or even days, at high agitation.

Therefore, while synthetic polyelectrolytes display superior thermal and biological resistance compared to natural polymers and their HM analogues provide the necessary viscosity in high salinity fluids, synthetic HM polyelectrolyte performance decreases in the presence of oil-based components (e.g., common lubricants) and at high pH and their slow dissolution in high brines makes them impractical for many applications. Thus, despite the availability of viscosifiers for use in the oil and gas industry, there still exists a need for compounds, compositions and methods having improved thermal and pH stability, that can dissolve to provide viscosity or friction reduction quickly, and that can act effectively in high salinity fluids, even in the presence of lubricants and oils.

BRIEF SUMMARY OF THE INVENTION

A copolymer is provided which comprises units derived from a nonionic monomer, an ionic monomer, and a surface-active monomer having the structure of Formula I:

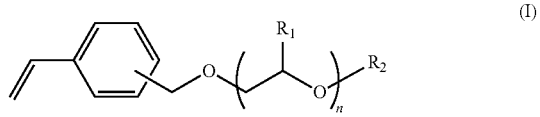

wherein n is from 1 to 60, $R_1$ is hydrogen, alkyl, or a combination thereof, and $R_2$ is a straight or branched $C_6$ to $C_{30}$ alkyl or a straight or branched $C_6$ to $C_{30}$ alkenyl, and wherein the copolymer is water-soluble and, when combined with an equal weight amount of hydrocarbon oil, provides equal to or greater than 40 cPs at 17 within 7.5 minutes upon mixing into an 11.3% TDS brine at 25° C. at 0.3% copolymer concentration by weight.

The copolymers described herein can be derived from nonionic monomers including acrylamide, methacrylamide, N,N-dimethylacrylamide, N,N-diethylacrylamide, N-isopropylacrylamide, N-vinylformamide, N-methyl-N-vinylacetamide, 1-vinyl-2-pyrrolidinone, N-tent-butylacrylamide, N-(hydroxymethyl)acrylamide, or a combination thereof; preferably, the nonionic monomer comprises acrylamide.

The copolymers described herein can be derived from ionic monomers including N,N-Dimethylaminopropyl acrylamide and N,N-dimethylaminopropyl methacrylamide and their quarternary or acid salts, including, but not limited to, dimethylaminopropylacrylamide methyl chloride quaternary salt, dimethylaminopropylacrylamide benzyl chloride quaternary salt, dimethylaminopropylmethacrylamide methyl chloride quaternary salt, dimethylaminopropylmethacrylamide benzyl chloride quaternary salt, diallyldiethylammonium chloride, 2-Acrylamido-2-methyl-1-propanesulfonic acid (ATBS or AMPS), acrylic acid, methacrylic acid, 4-vinylbenzenesulfonic acid, sulfomethylated acrylamide, vinyl sulfonic acid, vinylphosphonic acid, itaconic acid, maleic acid, a salt thereof, or a combination thereof; preferably, the ionic monomer comprises 2-acrylamido-2-methyl-1-propanesulfonic acid, or a salt thereof.

The copolymers described herein can consist essentially of units derived from the nonionic monomer, the ionic monomer, and the surface-active monomer having the structure of Formula I.

The copolymers described herein, wherein n is from 4 to 30, preferably, wherein n is from 6 to 24, more preferably, wherein n is from 6 to 12.

The copolymers described herein, wherein $R_2$ is a straight or branched $C_6$ to $C_{30}$ alkyl, preferably, wherein $R_2$ is a straight or branched $C_8$ to $C_{20}$ alkyl, more preferably, wherein $R_2$ is a straight or branched $C_{10}$ to $C_{16}$ alkyl.

The copolymers described herein, wherein the surface-active monomer of Formula I has the structure of Formula II or Formula III:

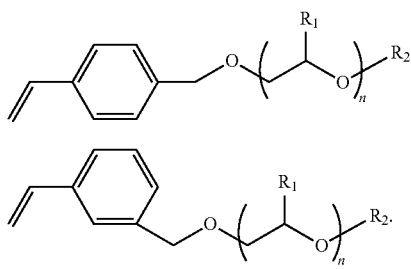

The copolymers described herein, wherein $R_1$ is hydrogen, methyl, ethyl, propyl, or a combination thereof; preferably, wherein $R_1$ is hydrogen, methyl, or a combination thereof; more preferably, wherein $R_1$ is hydrogen.

Composition comprising a surfactant and the copolymer described herein are also disclosed.

Compositions comprising a hydrocarbon oil, an oil-soluble or oil-dispersible rheology modifier, and the copolymers described herein are further disclosed.

The composition described herein can have the oil-soluble or oil-dispersable rheology modifier comprise a styrenic block copolymer, a linear diblock copolymer based on styrene and ethylene/propylene, a styrene-ethylene/propylene-styrene block copolymer, a styrene-ethylene/butylene-styrene block copolymer, a castor oil derivative, a hydrophobically modified clay-based additive (an organoclay) or a combination thereof.

The compositions described herein can have the copolymers described herein comprise from about 30 wt. % to about 70 wt. % of the total weight of the copolymer, a linear diblock copolymer based on styrene and ehtylene/propylene, and a hydrocarbon oil.

The compositions described herein can have the copolymers described herein comprise from about 45 wt. % to about 65 wt. % of the total weight of the copolymer, a linear diblock copolymer based on styrene and ehtylene/propylene, and a hydrocarbon oil.

The compositions described herein can further comprise a surfactant.

A method of synthesizing the copolymer as described herein comprising reacting the nonionic monomer and ionic monomer with the surface-active monomer having the structure of Formula I in the presence of a non-polymerizable surfactant.

The methods described herein, wherein the copolymer is produced using micellar copolymerization.

The methods described herein, wherein the combined monomer concentration is from about 25 wt. % to about 50 wt. %.

The compositions or methods described herein, wherein the surfactant or non-polymerizable surfactant has formula IV:

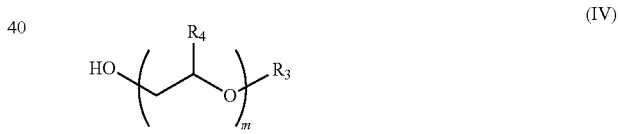

wherein m is from 1 to 60 and $R_3$ is a straight or branched $C_6$ to $C_{30}$ alkyl, a straight or branched $C_6$ to $C_{30}$ alkenyl, or an alkylphenol, and $R_4$ is hydrogen or $C_1$ to $C_6$ alkyl.

The compositions or methods described herein, wherein m is from 4 to 30; preferably, wherein m is from 6 to 12.

The methods described herein, wherein $R_3$ is a straight or branched $C_{10}$ to $C_{20}$ alkyl or a straight or branched $C_{10}$ to $C_{20}$ alkenyl; preferably, wherein $R_3$ is a straight or branched $C_{10}$ to $C_{20}$ alkyl; and more preferably, wherein $R_3$ is a straight or branched $C_{10}$ to $C_{16}$ alkyl.

A method of increasing the viscosity of an aqueous solution comprising contacting the copolymers or compositions described herein with the aqueous solution, thereby increasing the viscosity of the aqueous solution.

The methods described herein, wherein the concentration of the copolymer in the aqueous solution is from about 0.05 to about 0.75 wt. % based on the total weight of the aqueous solution.

The methods described herein, wherein the concentration of the copolymer in the aqueous solution is from about 0.05 to about 0.75 wt. % based on the total weight of the aqueous solution and includes about 0.05 to about 0.75 wt. % hydrocarbon oil based on the total weight of the aqueous solution and hydrocarbon oil.

A method of reducing drag of an aqueous solution comprising contacting the copolymers or compositions described herein with the aqueous solution, thereby decreasing turbulence of the aqueous solution.

The methods described herein, wherein the concentration of the copolymer in the aqueous solution is from about 0.02 to about 0.15 wt. % based on the total weight of the aqueous solution.

The methods described herein, wherein the aqueous solution is a well stimulation fluid and contacts a subterranean formation at a temperature from about 70° C. to about 235° C.

The methods described herein, wherein the well stimulation fluid has a salinity from about 3% to about 25% total dissolved solids.

The methods described herein, wherein the well stimulation fluid has a salinity from about 10% to about 25% total dissolved solids.

The methods described herein, wherein the well stimulation fluid has a pH of from about 4 to about 11.

The methods described herein, wherein the aqueous solution is a water-based drilling mud and contacts a subterranean formation at a temperature from about 70° C. to about 235° C.

The methods described herein, wherein the water based drilling mud has a salinity from about 3% to about 25% total dissolved solids.

The methods described herein, wherein the water based drilling mud has a salinity from about 10% to about 25% total dissolved solids.

The methods described herein, wherein the water based drilling mud has a pH of from about 7 to about 11.

The methods described herein, wherein the water based drilling mud has a pH of from about 9 to about 11.

The methods described herein, wherein the water-based drilling mud comprises an oil-based lubricant.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE INVENTION

Figure 1:
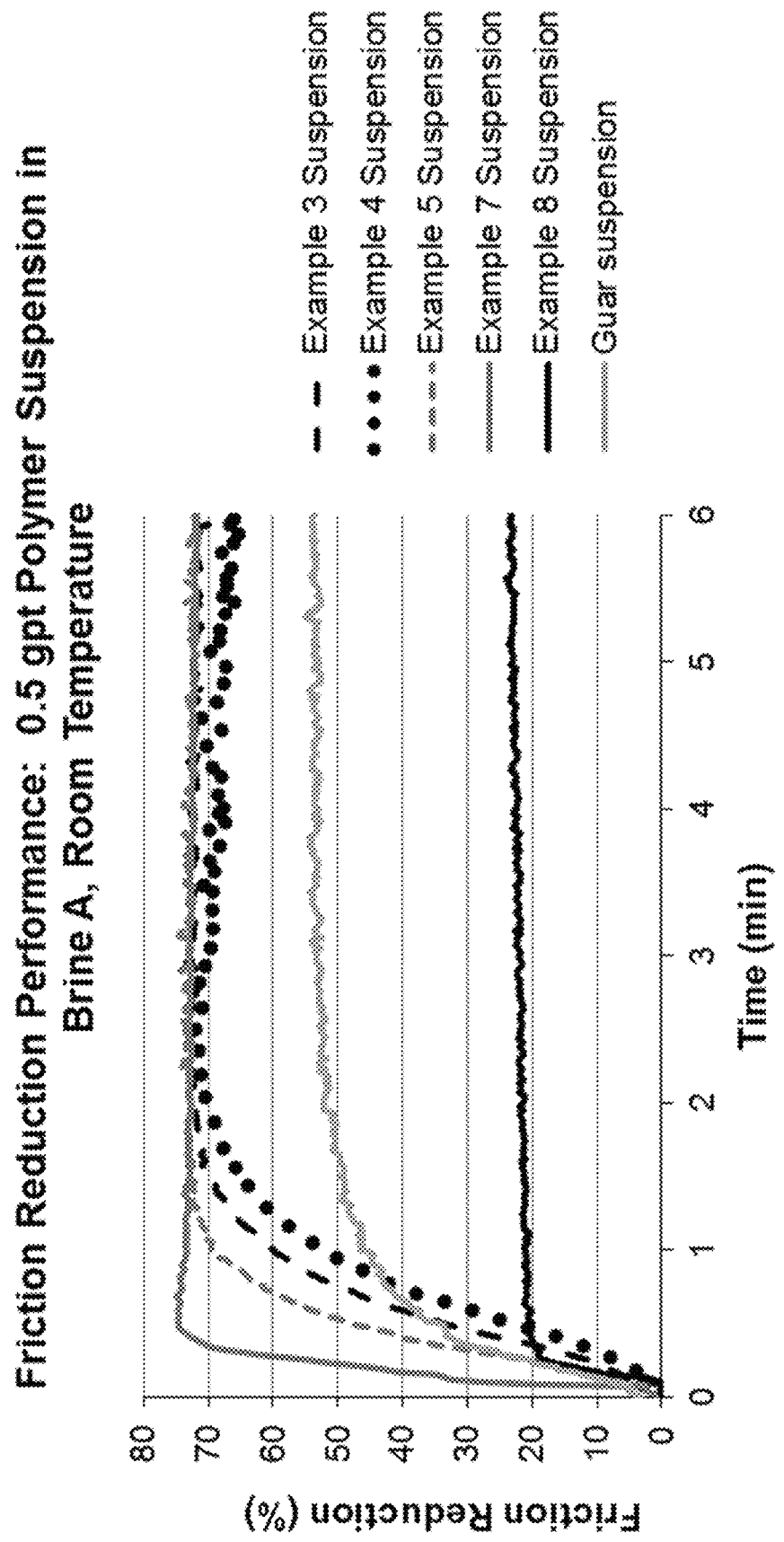
FIG. 1 shows a graph of the friction reduction percentage versus time in minutes for the compositions described in Examples 3-5, 7 and 8.

Disclosed herein are compounds and compositions, methods of using the compounds and compositions for increasing viscosity of a fluid and/or reducing drag of a fluid, and processes for their preparation. The compounds and compositions are comprised of synthetic hydrophobically modified (HM) polyelectrolytes particularly useful for increasing viscosity in high salinity brines. They possess resilient rheology profiles (viscosity over a range of shear rates) in target high brine well stimulation fluids and WBMs with and without lubricant or oil. Advantageously, the compositions and compounds disclosed herein have enhanced viscosity profiles in the presence of lubricant or oil. Further, unlike typical HM polyelectrolytes which have slow dissolution properties in brines, the HM polyelectrolytes disclosed herein exhibit unusually fast dissolution in the target brines without the addition of surfactants during dissolution, allowing for the desired performance to be realized very quickly and making them suitable for a wide range of applications.

These advantages are rooted in the composition and controlled incorporation of a polymerizable, non-ionic surfactant (a surface-active compound of Formula I). The structure of the polymerizable, non-ionic surfactant, allows the subsequent copolymers to maintain desired properties at high pH and high temperatures, thus broadening the temperature and pH range where synthetic HM polyelectrolytes can be advantageously used, beyond what is typically exhibited by current viscosifiers. In addition, these new copolymers show a significant increase in low-shear viscosity upon exposure to hydrocarbon oil when dissolved in brines. This property is unique to the copolymers described herein over typical hydrophobically modified polyelectrolytes and is dependent on polymer concentration and the particular Formula I monomer used. The polymers described herein have the potential to reduce the chemical footprint and simplify well stimulation fluid formulation on the fracturing pad. Specifically, the same polymer can be used as a friction reducer during slickwater fracturing or a linear gel viscosifer during gel fracturing, both in high salinity fluids. Further, they can break down more effectively after application and clear from the formation, avoiding formation damage and subsequent reduced hydrocarbon production. Additionally, the same polymer can be used as an effective viscosifier for high salinity water-based drilling muds.

A class of fast dissolving, water soluble, hydrophobically modified polyelectrolytes are provided.

A copolymer is provided which comprises units derived from a nonionic monomer, an ionic monomer, and a surface-active monomer having the structure of Formula I:

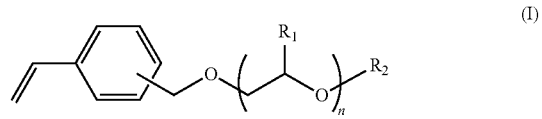

wherein n is from 1 to 60, $R_1$ is hydrogen, alkyl, or a combination thereof, and $R_2$ is a straight or branched $C_6$ to $C_{30}$ alkyl or a straight or branched $C_6$ to $C_{30}$ alkenyl, and wherein the copolymer is water-soluble and, when combined with an equal weight amount of hydrocarbon oil, provides equal to or greater than 40 cPs at 17 s$^{-1}$ within 7.5 minutes upon mixing into an 11.3% TDS brine at 25° C. at 0.3% copolymer concentration by weight.

Additionally, the copolymer is water-soluble and, when combined with an equal weight amount of hydrocarbon oil, can provide equal to or greater than the viscosity of guar having the concentration of from about 0.25 wt % to about 0.30 wt % in a brine solution (11.3% total dissolved solids at 25° C.) at from about 2.5 to about 7.5 minutes of mixing and measured at a shear rate of 17 s$^{-1}$.

Also, the copolymer is water-soluble and, when combined with an equal weight amount of hydrocarbon oil, reaches maximum viscosity within 1 hour, more preferably, within 30 minutes, and most preferably, within 10 minutes, while having a viscosity that is equal to or greater than an otherwise identical solution of guar or xanthum gum in a brine solution (>100 k TDS) and without post addition of surfactants.

The dissolution rate (or viscosity increase over time) of the copolymer is advantageously faster than common HM polyelectrolytes using alkyl acrylates or alkyl acrylamides, such as lauryl acrylate or N-lauryl acrylamide, as the hydrophobic monomer.

The copolymers described herein can be derived from nonionic monomers including acrylamide, methacrylamide, N,N-dimethylacrylamide, N,N-diethylacrylamide, N-isopropylacrylamide, N-vinylformamide, N-methyl-N-vinylacetamide, 1-vinyl-2-pyrrolidinone, N-tent-butylacrylamide, N-(hydroxymethyl)acrylamide, or a combination thereof; preferably, the nonionic monomer comprises acrylamide.

The copolymers described herein can be derived from ionic monomers including N,N-Dimethylaminopropyl acrylamide and N,N-dimethylaminopropyl methacrylamide and their quarternary or acid salts, including, but not limited to, dimethylaminopropylacrylamide methyl chloride quaternary salt, dimethylaminopropylacrylamide benzyl chloride quaternary salt, dimethylaminopropylmethacrylamide methyl chloride quaternary salt, dimethylaminopropylmethacrylamide benzyl chloride quaternary salt, diallyldiethylammonium chloride, 2-Acrylamido-2-methyl-1-propanesulfonic acid (ATBS or AMPS), acrylic acid, methacrylic acid, 4-vinylbenzenesulfonic acid, sulfomethylated acrylamide, vinyl sulfonic acid, vinylphosphonic acid, itaconic acid, maleic acid, a salt thereof, or a combination thereof; preferably, the ionic monomer comprises 2-acrylamido-2-methyl-1-propanesulfonic acid, or a salt thereof. The copolymers described herein can consist essentially of units derived from the nonionic monomer, the ionic monomer, and the surface-active monomer having the structure of Formula I.

The copolymers described herein can have n be from 4 to 30, from 4 to 26, from 4 to 24, from 4 to 22, from 4 to 20, from 4 to 18, from 4 to 16, from 4 to 14, from 4 to 12, from 6 to 30, from 6 to 26, from 6 to 24, from 6 to 22, from 6 to 20, from 6 to 18, from 6 to 16, from 6 to 14, preferably, wherein n is from 6 to 24, more preferably, wherein n is from 6 to 12.

The copolymers described herein, wherein $R_2$ is a straight or branched $C_6$ to $C_{30}$ alkyl, preferably, wherein $R_2$ is a straight or branched $C_8$ to $C_{20}$ alkyl, more preferably, wherein $R_2$ is a straight or branched $C_{10}$ to $C_{16}$ alkyl.

The copolymers described herein, wherein the surface-active monomer of Formula I has the structure of Formula II or Formula III:

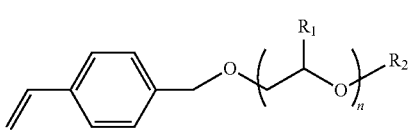

(II)

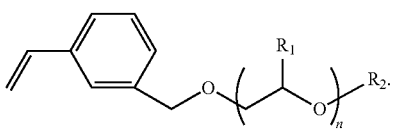

(III)

The copolymers described herein, wherein $R_1$ is hydrogen, methyl, ethyl, propyl, or a combination thereof; preferably, wherein $R_1$ is hydrogen, methyl, or a combination thereof; more preferably, wherein $R_1$ is hydrogen.

For the copolymers described herein can be derived from a reaction solution comprising from about 50 mole percent to about 95 mole percent, from about 60 mole percent to about 95 mole percent, from about 70 mole percent to about 95 mole percent, from about 75 mole percent to about 95 mole percent, from about 50 mole percent to about 90 mole percent, from about 50 mole percent to about 85 mole percent, from about 60 mole percent to about 90 mole percent, from about 60 mole percent to about 85 mole percent, from about 70 mole percent to about 90 mole percent, from about 70 mole percent to about 85 mole percent, or from about 75 mole percent to about 85 mole percent of the nonionic monomer, based on the total moles of the nonionic monomer, ionic monomer, and the surface-active monomer having the structure of formula I. Preferably, the reaction solution comprises from about 70 mole percent to about 90 mole percent, and more preferably, from about 75 mole percent to about 85 mole percent of the nonionic monomer, based on the total moles of the nonionic monomer, ionic monomer, and the surface-active monomer having the structure of formula I.

For the copolymers described herein can be derived from a reaction solution comprising from about 5 mole percent to about 50 mole percent, from about 5 mole percent to about 40 mole percent, from about 5 mole percent to about 30 mole percent, from about 5 mole percent to about 25 mole percent, from about 10 mole percent to about 50 mole percent, from about 10 mole percent to about 40 mole percent, from about 10 mole percent to about 30 mole percent, from about 10 mole percent to about 25 mole percent, or from about 15 mole percent to about 25 mole percent, of the ionic monomer, based on the total moles of the nonionic monomer, ionic monomer, and the surface-active monomer having the structure of formula I. Preferably, the reaction solution comprises from about 10 mole percent to about 30 mole percent, and more preferably, from about 15 mole percent to about 25 mole percent of the ionic monomer, based on the total moles of the nonionic monomer, ionic monomer, and the surface-active monomer having the structure of formula I.

For the copolymers described herein can be derived from a reaction solution comprising from about 0.01 mole percent to about 1 mole percent, from about 0.01 mole percent to about 0.5 mole percent, from about 0.01 mole percent to about 0.3 mole percent, from about 0.01 mole percent to about 0.2 mole percent, from about 0.01 mole percent to about 0.1 mole percent, from about 0.03 mole percent to about 1 mole percent, from about 0.03 mole percent to about 0.5 mole percent, from about 0.03 mole percent to about 0.3 mole percent, from about 0.03 mole percent to about 0.1 mole percent, from about 0.06 mole percent to about 1 mole percent, from about 0.06 mole percent to about 0.5 mole percent, from about 0.06 mole percent to about 0.3 mole percent, or from about 0.06 mole percent to about 0.1 mole percent of the surface-active monomer having the structure of formula I, based on the total moles of the nonionic monomer, ionic monomer, and the surface-active monomer having the structure of formula I. Preferably, the reaction solution comprises from about 0.03 mole percent to about 0.3 mole percent, and more preferably, from about 0.06 mole percent to about 0.1 mole percent of the surface-active monomer having the structure of formula I, based on the total moles of the nonionic monomer, ionic monomer, and the surface-active monomer having the structure of formula I.

The copolymers described herein can have an advantageous rate of viscosity increase in aqueous solution of high salinity. For example, the viscosity of a copolymer, when combined with an equal weight amount of hydrocarbon oil, having a concentration of from about 0.25 wt % to about 0.30 wt % in a brine solution (11.3% total dissolved solids) of from about 2.5 to about 7.5 minutes measured at a shear rate of 17 s$^{-1}$ is greater than or equal to the viscosity of guar having a concentration of from about 0.25 wt % to about 0.30 wt % in the same brine.

In particular, when the copolymers described herein are combined with an equal weight amount of hydrocarbon oil, the aqueous solution has equal to or greater than 40, 45, 50, 55, 60, 65, 70 or more cPs at 17 s$^{-1}$ within 7.5 minutes upon mixing into an 11.3% TDS brine at 25° C. at 0.3% copolymer concentration by weight.

The copolymers described herein also can provide friction reduction for a fluid flowing in a conduit. When measured on a flow loop over 4.8 feet of pipe one half-inch in diameter at a flow rate of 8 gal/min, an 11.3% TDS brine at 25° C. will measure at least 50% friction reduction at a polymer loading of 0.02 to 0.03%.

The flow curve in an 11.3% TDS brine at 25° C. of the copolymers described herein, when combined with an equal weight amount of hydrocarbon oil, can be at least 200 cPs at a shear rate of about 1 s$^{-1}$, at least 70 cPs at a shear rate of about 17 s$^{-1}$, and at least 20 cPs at a shear rate of about 100 s$^{-1}$ within 40 minutes of mixing at a copolymer concentration of from about 0.25 wt % to about 0.30 wt %.

The weight average molecular weight of the copolymer can be from about 1 million to about 20 million Daltons, from about 1 million to about 15 million, preferably from about 1 to about 10 million Daltons.

Composition comprising a surfactant and the copolymer described herein are also disclosed.

Compositions comprising a hydrocarbon oil, an oil-soluble rheology modifier, and the copolymers described herein are further disclosed.

The composition described herein can have the hydrocarbon oil comprise a linear paraffin with a carbon chain length of $C_{11}$-$C_{14}$, a hydrocarbon (e.g., a $C_{11}$-$C_{14}$ hydrocarbon), an n-alkane, an isoalkane, a cyclic hydrocarbon, a diesel fuel, a diesel oil, or a combination thereof. The hydrocarbon oil can comprise less than about 2% of aromatics.

The hydrocarbon oil can also be described as hydrocarbons, $C_{11}$-$C_{14}$, n-alkanes, isoalkanes, cyclics, <2% aromatics and include ESCAID™ 110 (available from ExxonMobil), CANOSOL® C-170 (available from Calumet Specialty Products), CALUMET LVP 100 (available from Calumet Specialty Products), EXXSOL D80™ (available from ExxonMobil Chemical), RECOSOL 78 (available from Recochem Inc.), YK D8ON (available from SK Global Chemical), KETRUL® D75 (available from Total Special Fluids), YK-D80 (available from SK Global Chemical), and UNIPAR® SH 170C (available from Unisource-Energy, LLC).

The composition described herein can have the oil-soluble or oil-dispersable rheology modifier comprise a styrenic block copolymer, a linear diblock copolymer based on styrene and ethylene/propylene, a styrene-ethylene/propylene-styrene block copolymer, a styrene-ethylene/butylene-styrene block copolymer, a castor oil derivative, a hydrophobically modified clay-based additive (an organoclay) or a combination thereof.

Any composition described herein can further comprise a solvent. The solvent can comprise an aromatic containing solvent (e.g., a heavy aromatic naphtha). Suitable aromatic containing solvents can include SOLVESSO™ 150 (available from Brenntag Sovents), PETROSOL 95A (available from Cepsa), SHELLSOL® A150 (available from Shell Chemicals), TOPSOL 150 (available from Top Solvent Co.), ATOSOL 150 (available from Total Petrochemicals & Refining USA), HYDROSOL A200 (available from DHC Solvent Chemie), HAN™ 857 (available from ExxonMobil), FLOTRAN® WD1000 (available from Nalco Champion), ANYSOL 150 (available from Hanwha Total Petrochemical), CAROMAX® 20 (available from Haltermann Carless), KESOL 150 (available from Kandla Energy and Chemicals), RECOSOL 150 (available from Recochem Inc.), HAN® 906 (available from ExxonMobil), and GF-S1500 (available from Changshu Alliance Chemical Co.).

The compositions described herein can have the copolymers described herein comprise from about 30 wt. % to about 70 wt. %, from about 30 wt. % to about 65 wt. %, from about 30 wt. % to about 60 wt. %, from about 30 wt. % to about 55 wt. %, from about 30 wt. % to about 50 wt. %, from about 35 wt. % to about 70 wt. %, from about 35 wt. % to about 65 wt. %, from about 35 wt. % to about 60 wt. %, from about 35 wt. % to about 55 wt. %, from about 35 wt. % to about 50 wt. %, from about 40 wt. % to about 70 wt. %, from about 40 wt. % to about 65 wt. %, from about 40 wt. % to about 60 wt. %, from about 40 wt. % to about 55 wt. %, from about 40 wt. % to about 60 wt. %, from about 40 wt. % to about 55 wt. %, from about 40 wt. % to about 50 wt. %, from about 45 wt. % to about 70 wt. %, from about 45 wt. % to about 65 wt. %, from about 45 wt. % to about 60 wt. %, from about 45 wt. % to about 55 wt. %, from about 45 wt. % to about 50 wt. %, of the total weight of the copolymer, a linear diblock copolymer based on styrene and ethylene/propylene, and the hydrocarbon oil. Preferably, the compositions described herein can have the copolymers described herein comprise from about 45 wt. % to about 65 wt. % of the total weight of the copolymer, styrene-ethylene/propylene-styrene block copolymer, and the hydrocarbon oil.

The compositions described herein can further comprise a surfactant.

A method of synthesizing the copolymer as described herein comprising reacting the nonionic monomer and ionic monomer with the surface-active monomer having the structure of Formula I in the presence of a non-polymerizable surfactant.

The methods described herein, wherein the copolymer is produced using micellar copolymerization.

The methods described herein, wherein the total monomer concentration is from about 10 wt. % to about 60 wt. %, from about 10 wt. % to about 55 wt. %, from about 10 wt. % to about 50 wt. %, from about 15 wt. % to about 60 wt. %, from about 15 wt. % to about 55 wt. %, from about 15 wt. % to about 50 wt. %, from about 20 wt. % to about 60 wt. %, from about 20 wt. % to about 55 wt. %, from about 20 wt. % to about 50 wt. %, from about 25 wt. % to about 60 wt. %, from about 25 wt. % to about 55 wt. %; preferably, the monomer concentration is from about 25 wt. % to about 50 wt. %.

The compositions or methods described herein, wherein the surfactant or non-polymerizable surfactant has formula IV:

wherein m is from 1 to 60 and $R_3$ is a straight or branched $C_6$ to $C_{30}$ alkyl, a straight or branched $C_6$ to $C_{30}$ alkenyl, or an alkylphenol, and $R_4$ is hydrogen or $C_1$ to $C_6$ alkyl.

The compositions or methods described herein, wherein m be from 4 to 30, from 4 to 26, from 4 to 24, from 4 to 22, from 4 to 20, from 4 to 18, from 4 to 16, from 4 to 14, from 4 to 12, from 6 to 30, from 6 to 26, from 6 to 24, from 6 to 22, from 6 to 20, from 6 to 18, from 6 to 16, from 6 to 14, preferably, wherein m is from 6 to 24, more preferably, wherein m is from 6 to 12.

The methods described herein, wherein $R_3$ is a straight or branched $C_{10}$ to $C_{20}$ alkyl or a straight or branched $C_{10}$ to $C_{20}$ alkenyl; preferably, wherein $R_3$ is a straight or branched $C_{10}$ to $C_{20}$ alkyl; and more preferably, wherein $R_3$ is a straight or branched $C_{10}$ to $C_{16}$ alkyl.

The surface-active monomer of Formula I can be prepared by the following general synthesis. The base can include sodium hydroxide, sodium methoxide, sodium tert-butoxide, and potassium tert-butoxide, preferably sodium tert-butoxide or potassium tert-butoxide, most preferably potassium tert-butoxide.

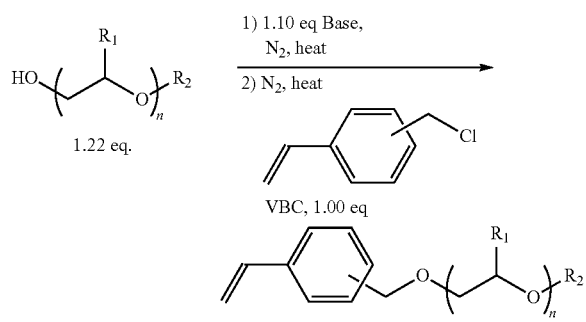

The copolymers described herein can be prepared by preparing a monomer phase. The monomer phase can be prepared by placing a monomer phase containing the surface-active monomer having the structure of Formula I, the nonionic monomer, deionized water, the non-polymerizable surfactant having the structure of Formula IV, and the ionic monomer in a reaction vessel. After the reaction mixture was mixed and a homogenous mixture is produced, the pH is adjusted to the desired value (e.g., pH of 6-6.5). Next, a chelating agent, a chain transfer agent, and an antifoamer are added. The monomer phase is cooled below 26° C. before the polymerization reaction is started.

Once the monomer phase is prepared, it is purged with nitrogen gas and an inhibitor, several thermal initiators, and a redox initiator are added with a short period between the addition of each agent. The polymerization is started by adding another redox initiator (e.g., ferrous ammonium sulfate (FAS) that is purged with nitrogen gas). After the reaction temperature is raised by 2° C., the nitrogen purge tube is moved to the reaction vessel headspace and the nitrogen gas flow is reduced. After reaction temperature stops increasing, the reaction is held at the peak temperature for about 2 hours.

After the polymerization reaction is completed, the polymer gel is collected, cut into pieces, dried in an oven at 95° C. for 2 hours, milled into a powder with a Retsch ZM200 mill, and sifted. Powder with particle sizes smaller than 100 mesh are collected as product.

The chelating agent can be pentasodium diethylenetriam inepentaacetate, tetrasodium ethylenediam inetetraacetate, or a combination thereof.

The chain transfer agent can be sodium formate, sodium hypophosphite, or a combination thereof.

The ratio of the non-polymerizable surfactant having the structure of Formula IV to the surface-active monomer having the structure of Formula I in the monomer phase can be from about 2:1 to about 10:1, from about 2:1 to about 9:1, from about 2:1 to about 8:1, from about 3:1 to about 10:1, from about 3:1 to about 9:1, from about 3:1 to about 8:1, from about 4:1 to about 10:1, from about 4:1 to about 9:1, or from about 4:1 to about 8:1. Preferably, the ratio of the non-polymerizable surfactant to the surface-active monomer having the structure of Formula I in the monomer phase can be from about 4:1 to about 8:1.

The ratio of the non-polymerizable surfactant having the structure of Formula IV to the surface-active monomer having the structure of Formula I in the monomer phase affects the copolymer structure because when the ratio is high so that there are more equivalents of the surfactant than the surface-active monomer having the structure of Formula I, the surface-active monomers having the structure of Formula I are more evenly spread throughout the backbone of the copolymer that further includes the nonionic and ionic monomers. This structure results because the micelles that form from the surfactant and the surface-active monomers having the structure of Formula I have more surfactant molecules than monomers in the micelle and thus, the surface-active monomers having the structure of Formula I are more spread out in the reaction mixture and react with the radical end unit of the growing polymer one or a few at a time. In contrast, when there is a low surfactant concentration, the surface-active monomers having the structure of Formula I form micelles with few or no surfactant molecules in the micelle, so they are close together when reacting with the radical end unit of the growing polymer and due to this proximity, many surface-active monomers having the structure of Formula I are reacted in a row before the other nonionic and ionic monomers react with the radical end unit.

A method of increasing the viscosity of an aqueous solution comprising contacting the copolymers or compositions or methods described herein with the aqueous solution, thereby increasing the viscosity of the aqueous solution.

The methods described herein, wherein when the copolymer is used for friction reduction, the concentration of the copolymer in the aqueous solution is from about 0.02 to about 0.15 wt. %, from about 0.02 to about 0.12 wt. %, from about 0.02 to about 0.10 wt. %, from about 0.05 to about 0.15 wt. %, or from about 0.05 to about 0.12 wt. %, based on the total weight of the aqueous solution.

The methods described herein, wherein when the copolymer is used as a linear gel viscosifier for proppant transport, the concentration of the copolymer in the aqueous solution is from about 0.05 to about 0.75 wt. %, from 0.05 to about 0.7 wt. %, from about 0.05 to about 0.6 wt. %, from about 0.05 to about 0.5 wt. %, from about 0.05 to about 0.4 wt. %, from about 0.2 to about 0.75 wt. %, from about 0.2 to about 0.6 wt. %, from about 0.2 to about 0.5 wt. %, from about 0.3 to about 0.75 wt. %, from about 0.3 to about 0.6 wt. %, or from about 0.3 to about 0.5 wt. %, based on the total weight of the aqueous solution.

The copolymer is also able to maintain its viscosity at a variety of temperatures. Thus, for the methods described herein, the aqueous solution can be a well stimulation fluid and contact a subterranean formation at a temperature from about 70° C. to about 235° C., from about 70° C. to about 205° C., or from about 70° C. to about 170° C.

The methods described herein, wherein the linear gel proppant transport solution has a salinity from about 3% to about 25%, from about 3% to about 20%, from about 3% to about 15% total dissolved solids. Preferably, the aqueous solution has a salinity from about 3% to about 15% total dissolved solids.

The copolymers also exhibit stability for a longer time at higher pHs than typical HM polyelectrolytes. For example, the copolymers herein have advantageous stability (e.g., stable for longer amounts of time) in aqueous solution having a pH of from about 6 to about 11 as compared to a hydrophobically modified polyelectrolyte having ester links from the hydrophobic portion to the polymer backbone.

The methods described herein, wherein the aqueous solution is a water-based drilling mud.

The methods described herein, wherein the water-based drilling mud comprises an oil-based lubricant.

Having described the invention in detail, it will be apparent that modifications and variations are possible without departing from the scope of the invention defined in the appended claims.

EXAMPLES

The following non-limiting examples are provided to further illustrate the properties of the disclosed copolymers and compositions.

Example 1

Preparation of VBL9

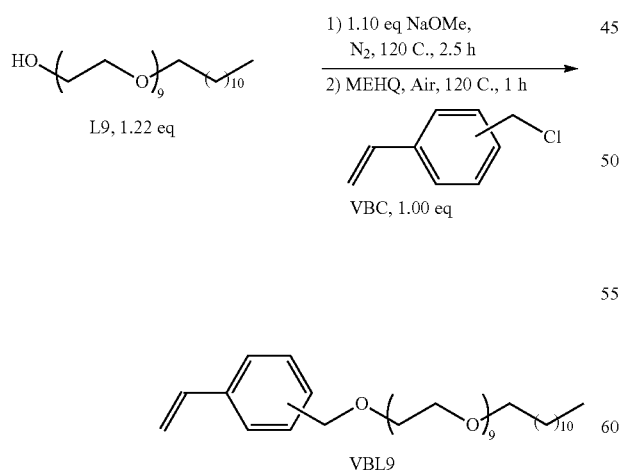

Procedure:

201.65 g Novel® 23E9 (Sasol; L9) was added to a 1 L pressure rated glass reactor with a Hastelloy® mechanical stirrer fitted with downward pitch blades and stainless steel baffle, a nitrogen gas and vacuum outlet/inlet (for keeping the reaction water free and for methanol/water removal), and thermometer. The surfactant was heated to 70° C. Sodium methoxide (NaOMe) (69.92 g, 24.3% in methanol) was then added via syringe, the reactor was closed, and then a vacuum was applied (~5 Torr). The stirring was increased from 400 RPM to 800 RPM. Once the vacuum pressure stabilized (~5 Torr), the reaction mixture was heated to 115-120° C. As the target reaction temperature was reached, the reaction mixture was kept at 115-120° C. for a total of 2.5 hours. The methanol collected by the vacuum trap was measured at 1.5 hours, 2.0 hours, and 2.5 hours. The amount of methanol collected did not change from 1.5 hours to 2.5 hours. The hazy, light yellow reaction mixture was then cooled to 70° C. and, subsequently, the reactor was returned to ambient pressure by releasing the vacuum and allowing air into the reactor headspace. The reaction became darker upon exposure to the incoming air. Next, methoxyphenol (MEHQ) (0.34 g) was added and reactor was sealed again. The reaction mixture became a yellow-amber color. Vinylbenzyl chloride (VBC; CAS 30030-25-2; 43.20 g) was then added dropwise over approximately 30 minutes by syringe pump so that the reaction mixture was maintained at 70° C. during the exothermic reaction. Upon completion of the VBC addition, the reaction mixture was kept at 70° C. for 1 hour. Finally, the reaction was cooled to ambient temperature to obtain a yellow-amber, opaque dispersion (crude VBL9) which settled after approximately 1 day of static storage due to the sodium chloride side-product. The sample was shaken well before each use in the following examples.

NMR Results (Deuterated DMSO):

VBC products (mole %)=98% VBL9, 2% VBOMe, 0% unreacted VBC; L9 derivatives/VBC derivatives molar ratio 1.2; VBL9=73.4% of final product based on ethylene glycol internal standard Example 2

Large Scale Preparation of VBL9

The VBL9 polymerizable surfactant was synthesized at a larger quantity using the reaction depicted below with the ingredients listed in Table 1. The procedure is described below.

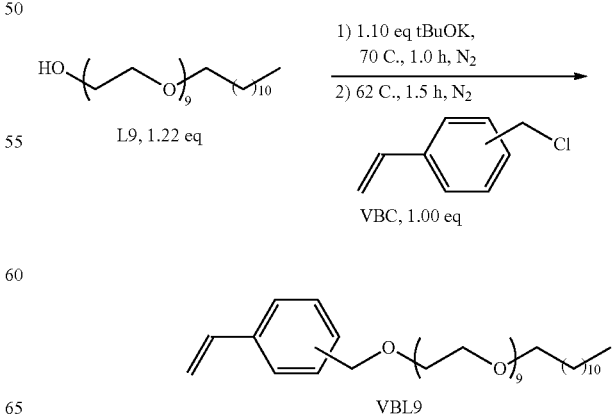

TABLE 1

Reagents used for Example 2.

| Reagent | CAS# | Purity (%) | Molar Equiv | MW (g/mol) | mole | Target Wt (g) | Wt. % |
|---|---|---|---|---|---|---|---|
| Vinylbenzyl chloride; VBC | 30030-25-2 | 97.1% | 1.00 | 152.62 | 1.909 | 300.0 | 15.700% |
| Novel® 23E9 (L9; Sasol) | 68002-97-1 | 100.0% | 1.22 | 589.8 | 2.329 | 1373.4 | 71.873% |
| Potassium tert-butoxide (tBuOK) | 865-47-4 | 99.5% | 1.10 | 112.21 | 2.100 | 236.8 | 12.392% |
| 4-Methoxyphenol (MEHQ) | 150-76-5 | 99% | | | | .67 | 0.035% |
| TOTAL Wt | | | | | | 1910.87 | 100.0% |

Procedure:

Novel® 23E9 (Sasol; L9) was added to a 2.5 L, 4 neck kettle reactor fitted with a mechanical pitch blade stirrer, a nitrogen gas inlet, condenser, and thermometer and heated to 30° C. while purging the solution with nitrogen gas and mixing. A small amount of Novel® 23E9 was held back for washing any residual potassium tert-butoxide from sides of the reactor or powder funnel after addition. The nitrogen purge was then moved to the reactor headspace and temporarily turned off. Potassium tert-butoxide was then added via a powder funnel over approximately 10 minutes. Then, the remaining Novel® 23E9 was added, washing sides of powder funnel and reactor walls of residual potassium tert-butoxide into reaction mixture. The nitrogen purge was then turned on in the reactor headspace at a very low purge rate. The reaction mixture was then heated to 70-75° C. for 1.5 hours. Next, the reaction mixture was cooled to 35° C. and vinylbenzyl chloride (VBC; CAS 30030-25-2) was added dropwise over approximately 30 minutes while the reaction mixture was maintained at less than 55° C. Once the vinylbenzyl chloride was added, the reaction mixture was heated to 62° C. for 1.5 hours. The absence of unreacted VBC was confirmed with thin layer chromatography (n-hexane). The reaction mixture was then cooled to ambient temperature and MEHQ was added and stirred for an additional 15 minutes. The resulting mixture was a dark-amber, opaque dispersion. The product was mixed well before use since it phase-separated over a few days due to the dispersed potassium chloride side-product.

NMR Results (Deuterated DMSO):

VBC products=100 mole % VBL9, No detected VBC by-products or unreacted VBC; L9 products/VBC products molar ratio 1.2; VBL9=73.5 wt % and tBuOH =6.4 wt % based on ethylene glycol internal standard.

The same synthetic protocol was used to prepare other polymerizable nonionic surfactants which vary in number of ethylene oxide units (m) and/or alkyl chain carbon content (n) by replacing the Novel® 23E9 with other nonionic surfactants, keeping the molar ratio of the reaction components the same.

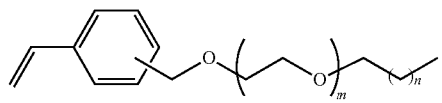

For example, Novel® 23E9 was simply replaced by Brij® 23, keeping the same mole amount, to prepare VBL23 that is used in Example 6. Varying the ethylene oxide content (m) and alkyl chain carbon content (n) allowed optimization of the subsequent polymer properties for target performance parameters following polymerization procedures described below.

Examples 3-4

Preparation of Polymers from VBL9

Monomer Phase

Hydrophobically modified polyelectrolytes were made using the polymerizable surfactant (VBL9) using the reagents and the quantities described in Table 2. To prepare the monomer phase, deionized (DI) Water, acrylamide (AcAm), ATBS, silicone antifoam, VBL9, Novel® 23E9 and sodium formate were each added to a magnetically stirred container in order. The pH was adjusted to 6.0-6.4 at ambient temperature) after the solutions were homogenous.

TABLE 2

| | | | EX. 3 | | EX. 4 | |
|---|---|---|---|---|---|---|
| Reagent | Function | Actives | Grams | Wt % | Grams | Wt % |
| DI Water | Solvent | | 870.56 | 29.019% | 1,110.53 | 37.018% |
| Acrylamide | Monomer | 49.5% | 1,064.31 | 35.477% | 1,206.35 | 40.212% |
| NaATBS | Monomer | 58% | 977.46 | 32.582% | 586.58 | 19.553% |
| VBL9 | Polymerizable surfactant | Ex 3 = 76.8% Ex 4 = 73.5% | 7.02 (1.3% tBuOH, 21.9% L9) | 0.234% | 7.31 (6.6% tBuOH, 19.9% L9) | 0.244% |
| Sulfuric Acid | pH adjustment | 25% | 0.46 | 0.015% | 0.09 | 0.003% |

TABLE 2-continued

| Reagent | Function | Actives | EX. 3 Grams | EX. 3 Wt % | EX. 4 Grams | EX. 4 Wt % |
|---|---|---|---|---|---|---|
| Sodium Formate | Chain Transfer Agent | 1.00% | 6.00 | 0.200% | 6.00 | 0.200% |
| Silicone Antifoam | Monomer Phase | | 0.630 | 0.021% | 0.63 | 0.021% |
| Novel ®23E9; polyoxyethylene (9) lauryl ether | Non-polymerizable surfactant | | 29.62 | 0.987% | 37.37 | 1.246% |
| HTEMPO | Inhibitor | 0.10% | 2.70 | 0.0900% | 2.70 | 0.0900% |
| V-501 | Thermal Initiator | 8.0% | 18.75 | 0.6250% | 18.75 | 0.6250% |
| Versenex 80 | Chelant | 10.0% | 9.00 | 0.3000% | 10.20 | 0.3400% |
| Tert-Butyl hydroperoxide (TBHP; 70% solution) | Redox Initiator | 0.30% | 4.11 | 0.1370% | 4.11 | 0.1370% |
| Ferrous Ammonium Sulfate (FAS) | Redox Initiator | 0.40% | 9.38 | 0.3127% | 9.38 | 0.3127% |
| TOTAL | Gel Product | Ex. 3 36.64% Ex. 4 31.42% | 3,000.00 | 100.00% | 3,000.00 | 100.00% |

Polymerization Reaction:

The monomer phase was then cooled to 15° C. and poured into a Dewar flask. The solution was then purged with nitrogen gas for 1 hour. During the purge, 4-hydroxy-2,2,6,6-tetramethylpiperidine 1-oxyl (HTEMPO), 4,4'-azobis(4-cyanovaleric acid (V-501), pentasodium diethylenetriamine-pentaacetate (Versenex™ 80), and TBHP were added in the first 30 minutes of the nitrogen gas purge. The pH was then checked again and adjusted to pH 7.7-8.1. Temperature probes that were calibrated to zero in an ice bath were inserted into the reaction dewar to monitor reaction progress. After 1 hour of the nitrogen purge, the polymerization reaction was initiated by adding an air-free, aqueous FAS solution. Once the reaction temperature had increased by 2° C., the nitrogen gas purge tube was pulled into the headspace and the nitrogen flow was reduced. The reaction was held at the peak temperature for 2 hours. Typically the initiation temperature was between 15-16° C., the time to a 2° C. increase was 5-6 minutes, the peak temperature was 91-93° C., and time to reach the peak temperature was approximately 25 minutes.

Gel Work-Up:

The final gel was trimmed by removing the edges (~¼ inch) to obtain the core of the gel. The core was then cut up into approximately 1×1 inch cubes with scissors and placed in a plastic bag to weigh. A lubricant (2% Span 20 in Hydrocarbon Oil) was added to the gel at 0.50 wt % of the gel and mixed well. The gel was then cut using a gel cutter at 1600 RPM (chamber was sprayed with lubricant prior to this step). Cut pieces were placed on a screen and dried in a convection oven at 95° C. for 2 hours before milling into a powder with a 24 teeth rotor mill at 18,000 RPM using a 1.0 mm ring sieve. The powder was then sifted. Fine powder (less than US mesh 100) and typical powder (more than US mesh # 100) were separated.

The mol % of each major component in the final polymer generated in each example (3-4) is described in Table 3.

TABLE 3

| | Mol | % |
|---|---|---|
| Ex. 3 | | |
| AcAm | 7.412 | 74.92 |
| VBL9 | 0.0076 | 0.077 |
| NaATBS | 2.473 | 25.00 |
| Total | 9.893 | 100.00 |
| Weight % Actives | 36.64% | |
| Ratio of Novel ® 23E9 to VBL9: 5.78 | | |
| Total Monomer: 1099.15 g | | |
| Ex. 4 | | |
| AcAm | 8.401 | 84.92 |
| VBL9 | 0.0076 | 0.077 |
| NaATBS | 1.484 | 15.00 |
| Total | 9.893 | 100.00 |
| Weight % Actives | 31.42% | |
| Ratio of Novel ® 23E9 to VBL9: 7.23 | | |
| Total Monomer: 942.73 g | | |

Examples 5-6

Alternative Preparation of Polymers with VBL9 and VBL23

Alternatively, hydrophobically modified polyelectrolytes were made using the polymerizable surfactant (VBL9 or VBL23) using the reagents and the quantities described in Table 4. Relatively the same procedure described in the previous example was used, but the monomer phase was cooled to 25° C. and additional thermal initiators, 2,2'-azobis [2-(2-imidazolin-2-yl)propane]dihydrochloride (VA-044) and 2,2'-azobis(2-methylpropionamidine) dihydrochloride (V-50), were added in the first 30 minutes of the nitrogen gas purge. Typically the initiation temperature was between 24-26° C., the time to a 2° C. increase was 5-6 minutes, the peak temperature was 96-100° C., and time to reach the peak temperature was between 17-25 minutes.

TABLE 4

| Reagent | Function | Actives | EX. 5 Grams | EX. 5 Wt % | EX. 6 Grams | EX. 6 Wt % |
|---|---|---|---|---|---|---|
| DI Water | Solvent | | 261.58 | 32.698% | 257.86 | 32.233% |
| Acrylamide | Monomer | 49.5% | 269.81 | 33.726% | 269.88 | 33.735% |
| NaATBS | Monomer | 58% | 247.81 | 30.976% | 247.77 | 30.971% |
| VBL9 | Polymerizable surfactant | 77.0% (23% L9) | 1.95 | 0.244% | 0 | 0% |
| VBL23 | Polymerizable surfactant | 66.0% (34.0% L23) | 0 | 0% | 3.20 | 0.400% |
| Sulfuric Acid | pH adjustment | 25% | 0 | 0% | 0.25 | 0.031% |
| Sodium Formate | Chain Transfer Agent | 1.00% | 2.80 | 0.350% | 0 | 0% |
| Sodium Hypophosphite | Chain Transfer Agent | 0.10% | 0 | 0% | 2.80 | 0.350% |
| Silicone Antifoam | Monomer Phase | | 0.160 | 0.020% | 0.160 | 0.020% |
| Novel® 23E9; polyoxyethylene (9) lauryl ether | Non-polymerizable surfactant | | 5.69 | 0.711% | 0 | 0% |
| Brij® L23; polyoxyethylene (23) lauryl ether | Non-polymerizable surfactant | | 0 | 0% | 7.88 | 0.985% |
| HTEMPO | Inhibitor | 0.10% | 1.20 | 0.1500% | 1.20 | 0.1500% |
| VA-044 | Thermal Initiator | 10.0% | 1.00 | 0.1250% | 1.00 | 0.1250% |
| V-50 | Thermal Initiator | 10.0% | 1.00 | 0.1250% | 1.00 | 0.1250% |
| V-501 | Thermal Initiator | 8.0% | 2.50 | 0.3130% | 2.50 | 0.3130% |
| Versenex 80 | Chelant | 10.0% | 1.80 | 0.2250% | 1.80 | 0.2250% |
| Tert-Butyl hydroperoxide (TBHP; 70% solution) | Redox Initiator | 0.30% | 0.82 | 0.1025% | 0.82 | 0.1025% |
| Ferrous Ammonium Sulfate (FAS) | Redox Initiator | 0.40% | 1.87 | 0.2340% | 1.87 | 0.2340% |
| TOTAL | Gel Product | Ex. 5 34.85% Ex. 6 34.93% | 800.00 | 100.0000% | 800.00 | 100.0000% |

The mol % of each major component in the final polymer generated in each example (5-6) is described in Table 5.

TABLE 5

| | Mol | % |
|---|---|---|
| Ex. 5 | | |
| AcAm | 1.879 | 74.92 |
| VBL9 | 0.0021 | 0.086 |
| NaATBS | 0.627 | 25.00 |
| Total | 2.508 | 100.00 |
| % Actives | 34.85% | |
| Ratio of Novel® 23E9 to VBL9: 4.09 | | |
| Total Monomer: 278.79 g | | |
| Ex. 6 | | |
| AcAm | 1.879 | 74.94 |
| VBL23 | 0.0016 | 0.064 |
| NaATBS | 0.627 | 25.00 |
| Total | 2.508 | 100.00 |
| % Actives | 34.93% | |
| Ratio of Brij® L23 to VBL23: 4.25 | | |
| Total Monomer: 279.41 g | | |

Examples 7-8

Comparative Examples

Comparative polymers that represent non-associative polymers, Example 7, or typical hydrophobically modified polyelectrolytes that use acrylate-based hydrophobic monomers with common ionic surfactants, such as sodium dodecylsulfate, Example 8, were prepared as described above, but using the formulas shown in Table 6.

TABLE 6

| Reagent | Function | Actives | EX. 7 Grams | EX. 7 Wt % | EX. 8 Grams | EX. 8 Wt % |
|---|---|---|---|---|---|---|
| DI Water | Solvent | | 867.67 | 28.922% | 231.52 | 28.940% |
| Acrylamide | Monomer | 49.5% | 1,065.45 | 35.515% | 282.79 | 35.349% |
| NaATBS | Monomer | 58% | 977.46 | 32.582% | 260.62 | 32.578% |
| Lauryl Acrylate | Typical Hydrophobic Monomer | 95.0% | 0 | 0% | 2.36 | 0.295% |
| Sulfuric Acid | pH adjustment | 25% | 0 | 0% | 0.13 | 0.016% |
| Sodium Formate | Chain Transfer Agent | 1.00% | 6.00 | 0.200% | 1.60 | 0.200% |
| Silicone Antifoam | Monomer Phase | | 0.631 | 0.021% | 0.160 | 0.020% |
| Novel ® 23E9; polyoxyethylene (9) lauryl ether | Non-polymerizable surfactant | | 38.85 | 1.295% | 0 | 0% |
| Sodium Dodecylsulfate (SDS) | Typical Ionic Surfactant | | 0 | 0% | 9.10 | 1.138% |
| HTEMPO | Inhibitor | 0.10% | 2.70 | 0.0900% | 0.72 | 0.0900% |
| V-501 | Thermal Initiator | 8.0% | 18.75 | 0.6250% | 5.00 | 0.6250% |
| Versenex 80 | Chelant | 10.0% | 9.00 | 0.3000% | 2.40 | 0.3000% |
| Tert-Butyl hydroperoxide (TBHP; 70% solution) | Redox Initiator | 0.30% | 4.11 | 0.1370% | 1.10 | 0.1370% |
| Ferrous Ammonium Sulfate (FAS) | Redox Initiator | 0.40% | 9.38 | 0.3127% | 2.50 | 0.3125% |
| TOTAL | Gel Product | Ex. 3 36.64% Ex. 4 36.67% | 3,000.00 | 100.00% | 800.00 | 100.00% |

Summary of Polymer Examples

TABLE 7

| Example | Monomer 1 (molar ratio) | Monomer 2 (molar ratio) | Monomer 3 (molar ratio) | Surfactant | Surfactant:Monomer (wt. ratio) |
|---|---|---|---|---|---|
| 3 | 74.92% Acrylamide | 25% ATBS | 0.077% VBL9 | L9 | 5.78:1 |
| 4 | 84.92% Acrylamide | 15% ATBS | 0.077% VBL9 | L9 | 7.23:1 |
| 5 | 74.92% Acrylamide | 25% ATBS | 0.086% VBL9 | L9 | 4.09:1 |
| 6 | 74.94% Acrylamide | 25% ATBS | 0.064% VBL23 | L23 | 4.25:1 |
| 7 (Comp.) | 75% Acrylamide | 25% ATBS | N/A | L9 | N/A |
| 8 (Comp.) | 74.65% Acrylamide | 25% ATBS | 0.35% Lauryl Acrylate | SDS | 4.06:1 |

Example 9

Preparation of Dry Polymer Suspension in Oil

A dry polymer suspension in oil was prepared using the polymers prepared in Examples 3-6. The suspension was prepared using 48.35 wt % hydrocarbon oil, 1.65 wt % Kraton G1701 MU (a Styrene-ethylene/propylene-styrene block copolymer) and 50 wt % of the HA polymer. The detailed methods of preparing the dispersion are described below.

Dry polymers prepared in example 3-5 were milled into fine powder as described in the gel work-up section (e.g., <100 microns median particle size; typically about 60-80 micron median particle size). Hydrocarbon oil (19.34 g) was added to a container and heated to 63° C. while stirring with a pitch blade fitted on a stir rod. Kraton G1701 MU (0.66 g) was added slowly while mixing. The mixture was continually mixed at 63-65° C. until the Kraton dry polymer completely dissolved (~45 min). The viscosified oil was then cooled to 40° C. and then 20 g of dry polymer (Example 3 or 4 or 5) was added slowly while mixing vigorously. The mixture was maintained at 40° C. while mixing for 15-30 minutes after all of the dry polymer was added. The final product appeared to be very stable, (i.e., no oil split) with sitting on bench at ambient temperatures.

Example 10

Formulas for Brines Used in Performance Evaluations

Table 8 illustrates the composition of the brines used to evaluate the performance of the copolymers disclosed herein relative to benchmarks and comparative synthetic polyelectrolytes.

TABLE 8

|  | percent |
|---|---|
| Brine A | |
| NaCl | 9.1830% |
| CaCl2—2H2O | 2.1600% |
| MgCl2—6H2O | 0.7710% |
| KCl | 0.0908% |
| SrCl2—6H2O | 0.1179% |
| DI water | 87.6773% |
| Total | 100.0000% |
| Total TDS = 113,000 ppm (11.3%) | |
| Brine B | |
| NaCl | 12.5000% |
| DI water | 87.5000% |
| Total | 100.0000% |
| Total TDS = 125,000 ppm (12.5%) | |

Example 11

Dissolution Speed Test in Brine A

Polymer examples 3-8 were tested to determine dissolution rate, i.e. rate of viscosity increase, relative to the natural polymer benchmark, guar, in Brine A at 0.25% or 0.30% polymer concentration. The performance requirement was to reach similar or higher absolute viscosity at similar times at ≤40 s$^{-1}$. The dry polymer powder compositions were added directly to the brine containing none or equal amount of hydrocarbon oil while stirring at 1800 RPM with a cage stirrer for 30 seconds, then stirring at 800 RPM for the duration of the test. The dry polymer suspension compositions were added directly to the brine while stirring at 800 rpm with a cage stirrer. Typically, the total volume was 100.00 g and the cage stirrer was sufficiently close to the walls of the container so to reduce wall slippage during the viscosity build to give a uniform, viscoelastic fluid. The samples were mixed for the indicated time, and then immediately transferred via pipet to the rheometer sample holder.

All rheology measurements were conducted using an Anton Paar MCR320 rheometer. The tests were conducted with a double gap cylinder fixture. The viscosity of all samples were measured at a constant shear of 17 s$^{-1}$ at a constant temperature of 25° C. immediately after transfer from the mixing vessel described above. The data points were taken at the same time interval from the start of the measurement. The results are shown in Tables 9-11.

The data shows that the described copolymers, represented here by examples 3-5, either added as a dry polymer suspension (Table 9), or as a dry powder into a brine with equal amount of hydrocarbon oil (Table 10), exhibit very similar dissolution speed/viscosity increase as guar at equal or nearly equal polymer dosage. Similarities in absolute viscosity at the indicated dissolution times between the data in Table 9 and Table 10 show suspension of the dry powder as described above is not necessary to match the fast dissolution of guar. It is, however, important to have hydrocarbon oil present under these conditions, see Example 12. For comparison to a standard synthetic polyelectrolyte (Example 7) and to a standard hydrophobically modified synthetic polyelectrolyte (Example 8), see Table 11. The comparison demonstrates the novel dissolution speed, unique absolute viscosity increase, and unusual oil tolerance/synergism the described polymers and compositions exhibit. In addition, the disclosed copolymers and compositions do not need an external surfactant as seen for Example 8 when the ethoxylated surfactant is not included (further exemplified in Example 11).

TABLE 9

Compare Viscosities (cPs) of Suspension Formulas in Brine A to Guar Standard (cPs @ 17 s$^{-1}$)

| | Minutes of Mixing (800 RPM Cage Stirrer) | | | |
|---|---|---|---|---|
| | 2.5 | 7.5 | 17.5 | 30 |
| 0.25% Guar Powder | 41.2 | 61.3 | 64.5 | 67.6 |
| 0.3% Guar Powder | 65.3 | 94.1 | 99.1 | 102.0 |
| 0.6% Example 3 Suspension | 29.5 | 65.8 | 77.2 | 86.1 |
| 0.6% Example 4 Suspension | 32.0 | 100.1 | 110.5 | 121.3 |
| 0.5% Example 4 Suspension | 25.0 | 61.7 | 76.6 | 86.6 |
| 0.6% Example 5 Suspension | 36.6 | 56.3 | 65.6 | 67.1 |

TABLE 10

Compare Viscosities (cPs) of Powder Addition to Brine A including Hydrocarbon Oil to Guar Standard (cPs @ 17 s$^{-1}$)

| | Minutes of Mixing (800 RPM Cage Stirrer) | | | |
|---|---|---|---|---|
| | 2.5 | 7.5 | 17.5 | 30 |
| 0.25% Guar Powder | 41.2 | 61.3 | 64.5 | 67.6 |
| 0.3% Guar Powder | 65.3 | 94.1 | 99.1 | 102.0 |
| 0.3% Example 3 + Hydrocarbon Oil | 27.7 | 69.4 | 79.8 | 90.5 |
| 0.3% Example 4 + Hydrocarbon Oil | 26.2 | 95.7 | 116.0 | 126.4 |
| 0.25% Example 4 + Hydrocarbon Oil | 18.3 | 67.7 | 86.7 | 89.3 |

TABLE 11

Viscosities (cPs) of Non-HA and Typical HA Polymers for Comparative Purposes in Brine A (cPs @ 17 s$^{-1}$)

| | Minutes of Mixing (800 RPM Cage Stirrer) | | | |
|---|---|---|---|---|
| | 2.5 | 7.5 | 17.5 | 30 |
| 0.3% Comp Example 7 | 15.9 | 15.7 | 16.1 | 16.3 |
| 0.3% Comp Example 7 + Hydrocarbon Oil | 16.1 | 16.5 | 16.8 | 17.2 |
| 0.3% Comp Example 8 | 2.6 | 2.8 | 3.6 | 2.8 |
| 0.3% Comp Example 8 + 390 ppm ethoxylated alcohol CAS # 78330-21-9 | 22.0 | 26.4 | 53.7 | 75.7 |
| 0.3% Comp Example 8 + 390 ppm ethoxylated alcohol CAS # 78330-21-9 + Hydrocarbon Oil | 9.7 | 12.4 | 17.6 | 20.1 |

Example 12

Flow Curve in Brine A and Effect of Hydrocarbon Oil

At 40 minutes into the dissolution speed test described in Example 11, the sample is subjected to a shear sweep. The sample was transferred via pipet to the rheometer sample holder and pre-sheared at 100 s$^{-1}$, 25° C. for 30 seconds, and then left undisturbed at 25° C. for 60 seconds before the data collection began. The shear sweep experiments (effect of shear rate on viscosity) were performed with shear rate control from 1 to 511 s$^{-1}$ (10 data points/decade with 28 points total, including 17 s$^{-1}$ and 100 s$^{-1}$) at a constant temperature of 25° C. The results are shown in Tables 12-14.

The data shows that the polymers, represented here by Examples 3-5, either added as a dry polymer suspension (Table 12), or as a dry powder into Brine A with equal amount of hydrocarbon oil (Table 13), exhibit better flow curve characteristics compared to guar at equal or nearly equal polymer dosage. High viscosity at low shear rates, such as ≤40 s$^{-1}$, in flow curves correlate well to desired proppant transport properties of the fluid. Similarities in absolute viscosity at the indicated shear rates between the data in Table 12 and Table 13 show suspension of the dry powder as described in the compositions above is not necessary to match the fast dissolution of guar. It is, however, important to have hydrocarbon oil present under these conditions, see Table 13, comparing with and without hydrocarbon oil. This is a very unique property of the disclosed copolymers and compositions relative to standard hydrophobically modified synthetic polyelectrolytes. For comparison to a standard synthetic polyelectrolyte (Example 7) and to a standard hydrophobically modified synthetic polyelectrolyte (Example 8), see Table 14. The comparison demonstrates the novel dissolution speed, unique absolute viscosity increase, unusual oil tolerance/synergism the described copolymers and compositions exhibit, and ideal linear gel viscosifier flow characteristics. In addition, the copolymers and compositions do not need an external surfactant as seen for Example 8 when the ethoxylated surfactant is not included (Table 14).

TABLE 12

Compare Viscosity (cPs) vs. Shear to Guar Standard at 40 Minutes of Mixing in Brine A (800 RPM Cage Stirrer)

| | Shear Rate | | | |
|---|---|---|---|---|
| | 1 s$^{-1}$ | 17 s$^{-1}$ | 100 s$^{-1}$ | 511 s$^{-1}$ |
| 0.25% Guar Powder | 104.6 | 68.7 | 34.8 | 16.5 |
| 0.3% Guar Powder | 186.7 | 103.9 | 47.0 | 20.6 |
| 0.6% Example 3 Suspension | 247.5 | 109.5 | 33.5 | 13.2 |
| 0.6% Example 4 Suspension | 422.3 | 156.6 | 42.5 | 15.2 |
| 0.5% Example 4 Suspension | 286.1 | 106.8 | 30.2 | 11.4 |
| 0.6% Example 5 Suspension | 236.3 | 80.4 | 25.5 | 11.9 |

TABLE 13

Compare Viscosity (cPs) vs. Shear to Guar Standard at 40 Minutes of Mixing in Brine A (800 RPM Cage Stirrer) with and without Hydrocarbon Oil

| | Shear Rate | | | |
|---|---|---|---|---|
| | 1 s$^{-1}$ | 17 s$^{-1}$ | 100 s$^{-1}$ | 511 s$^{-1}$ |
| 0.3% Example 3 | 32.2 | 25.9 | 18.7 | 11.4 |
| 0.3% Example 3 + Hydrocarbon Oil | 272.6 | 105.0 | 30.3 | 12.3 |
| 0.25% Example 4 | 25.3 | 21.1 | 17.4 | 10 |
| 0.25% Example 4 + Hydrocarbon Oil | 274.4 | 82.5 | 23.4 | 10.2 |

TABLE 14

Viscosity (cPs) of Non-HA and Typical HA Polymers for Comparative Purposes in Brine A (800 RPM Cage Stirrer)

| | Shear Rate | | | |
|---|---|---|---|---|
| | 1 s$^{-1}$ | 17 s$^{-1}$ | 100 s$^{-1}$ | 511 s$^{-1}$ |
| 0.3% Comp Example 7 | 21.3 | 16.3 | 10.9 | 7.6 |
| 0.3% Comp Example 7 + Hydrocarbon Oil | 22.9 | 17.5 | 11.5 | 7.9 |
| 0.3% Comp Example 8 | 21.2 | 7.3 | 4.7 | 5.0 |
| 0.3% Comp Example 8 + 390 ppm ethoxylated alcohol CAS # 78330-21-9 | 145.4 | 77.3 | 45 | 20.1 |
| 0.3% Comp Example 8 + 390 ppm ethoxylated alcohol CAS # 78330-21-9 + Hydrocarbon Oil | 70.1 | 18.1 | 12.6 | 9.1 |

Example 13

Flow Curve in Brine B and Effect of Drilling Lubricant

Polymer Examples 3-8 were tested to determine flow curve profiles, relative to the natural polymer benchmark, xanthan gum, in Brine B at 0.50% polymer concentration at 150° F. with or without Torq Free® HD (Nalco Champion, An Ecolab Company) lubricant. The performance requirement is to reach similar absolute viscosity, particularly at 5 $s^{-1}$ and 10 $s^{-1}$, compared to xanthan gum at 20 minutes of dissolution time under the described conditions. The dry polymer powder compositions were added directly to Brine B containing either no drilling lubricant or equal amount of drilling lubricant, Torq Free® HD, while stirring at 1800 RPM with a cage stirrer for 30 seconds, then stirring at 800 RPM for the duration of the mixing time at room temperature. Alternatively, the Torq Free® HD lubricant was added after dissolving the dry polymer in Brine B as described and mixed for an additional 10 minutes at 800 RPM with a cage stirrer. Typically, the total volume was 100.00 g and the cage stirrer was sufficiently close to the walls of the container so to reduce wall slippage during the viscosity build to give a uniform, viscoelastic fluid. The samples were mixed for the indicated time, and then immediately transferred via pipet to the rheometer sample holder keeping shear history consistent.

All rheology measurements were conducted using an Anton Paar MCR320 rheometer. The tests were conducted with a concentric cylinder fixture. Immediately after mixing as described above, the sample was transferred via pipet to the rheometer sample holder, heated to a steady 150° F., pre-sheared at 100 $s^{-1}$, 150° F. for 30 seconds, and then left undisturbed at 150° F. for 60 seconds before the data collection began. The shear sweep experiments (effect of shear rate on viscosity) were performed with shear rate control from 0.1 to 1000 $s^{-1}$ (10 data points/decade with 41 points total) at a constant temperature of 150° F. The results are shown in Tables 15-17.

The data shows that the polymers, represented here by Examples 3-5, added as a dry powder into Brine B with and without Torq Free® HD lubricant, exhibit similar flow curve characteristics compared to xanthan gum at equal polymer dosage. High viscosity at low shear rates in flow curves, such as at 5 and 10 $s^{-1}$, correlate well to desired drilling fluid properties. It is important to maintain the high viscosity at low shear rates even when typical drilling lubricants, such as Torq Free® HD, are used. Most water-based drilling muds are known to use drilling lubricants, thus the viscosifier must be tolerant to such additives. The unique lubricant tolerance by the disclosed copolymers and compositions is illustrated when comparing the results for Examples 3-5 in Tables 15 and 16 where the viscosities are maintained within the target viscosity profile no matter the presence of the lubricant. In fact, the addition of the lubricant caused Examples 3-5 to assume a viscosity profiles closer to xanthum gum than it could achieve alone. Example 6, which used a 23 ethylene oxide derived polymerizable surfactant called VBL23, demonstrates in Table 15 and 16 that longer ethylene oxide extension of the hydrophobe from the polyelectrolyte backbone can lead to the necessity of the oil based lubricant to meet flow curve requirements under the indicated conditions. This is the opposite compared to standard hydrophobically modified synthetic polyelectrolytes where the viscosity is typically decreased by 10 times to 100 times when exposed to lubricant or hydrocarbon solvent under similar conditions. For comparison to a standard synthetic polyelectrolyte (Example 7) and to a standard hydrophobically modified synthetic polyelectrolyte (Example 8), see Table 17. The comparisons demonstrate the advantageous flow curve characteristics compared to other synthetic polyelectrolytes in high brine and the novel oil tolerance/synergism of the polymers. In addition, the composition does not need an external surfactant as seen for Example 8 when the ethoxylated surfactant is not included (Table 17).

TABLE 15

Viscosities (cPs) of Powder Addition to Brine B Including Torq Free ® HD Lubricant @ 2%

| | Shear Rate (≥20 min mix 800 RPM Cage Stirrer) | | | |
|---|---|---|---|---|
| | 1 $s^{-1}$ | 5 $s^{-1}$ | 10 $s^{-1}$ | 500 $s^{-1}$ |
| Desired viscosity range | | (800-1000) | (500-600) | |
| 0.5% Xanthan Gum | 3372 | 985 | 565 | 27 |
| 0.5% Example 3 | 2004 | 804 | 499 | 21 |
| 0.5% Example 4 | 2448 | 918 | 539 | 23 |
| 0.5% Example 5 | 3115 | 1023 | 571 | 25 |
| 0.5% Example 6 | 1962 | 747 | 436 | 19 |

TABLE 16

Viscosities (cPs) of Powder Addition to Brine B

| | Shear Rate (≥20 min mix 800 RPM Cage Stirrer) | | | |
|---|---|---|---|---|
| | 1 $s^{-1}$ | 5 $s^{-1}$ | 10 $s^{-1}$ | 500 $s^{-1}$ |
| 0.5% Xanthan Gum | 3866 | 1137 | 650 | 29 |
| 0.5% Example 3 | 1395 | 1147 | 795 | 40 |
| 0.5% Example 4 | 1894 | 1534 | 1021 | 48 |
| 0.5% Example 5 | 3685 | 1760 | 1079 | 37 |
| 0.5% Example 6 | 90 | 80 | 75 | 27 |

TABLE 17

Viscosities (cPs) of Non-HA and Typical HA Polymers for Comparative Purposes in Brine B

| | Shear Rate (≥20 min mix 800 RPM Cage Stirrer) | | | |
|---|---|---|---|---|
| | 1 $s^{-1}$ | 5 $s^{-1}$ | 10 $s^{-1}$ | 500 $s^{-1}$ |
| 0.5% Example 7 | 36 | 33 | 30 | 10 |
| 0.5% Example 7 + 2% Torq Free ® HD | 42 | 37 | 33 | 11 |
| 0.5% Example 8 | 0 | 1 | 1 | 3 |
| 0.5% Example 8 + Torq Free ® HD | 0 | 1 | 1 | 3 |
| 0.5% Example 8 + 650 ppm ethoxylated alcohol CAS # 78330-21-9 | 3419 | 1117 | 1067 | 38 |
| 0.5% Example 8 + 650 ppm ethoxylated alcohol CAS # 78330-21-9 + 2% Torq Free ® HD | 375 | 137 | 84 | 11 |

Example 14

Friction Reduction Performance Evaluations

The friction reduction performance of a product was measured using a Chandler Engineering SPR-187 flow loop. Friction reduction was determined by measuring the pressure differential over 4.83 feet of pipe 0.5 inches in diameter at an initial flow rate of 8.0 gallon/minute. The test water was prepared by dissolving any salts into 5 gallons of tap water with agitation. The test water in this case was Brine A described in Example 10. The suspensions of guar, Examples 3-5, and representative suspensions of Examples 7 and 8 were added between 5 and 10 seconds after the start of measurements at a dose of 0.5 gallons per thousand gallons (gpt). Data was logged every second and friction reduction was calculated following the formula:

$$\% \text{ Friction Reduction}(t) = \frac{\Delta P_0 - \Delta P_t}{\Delta P_0} \times 100$$

where $\Delta P_0$ and $\Delta P_t$ are the pressure differentials at t=0 (before product addition) and at time t, respectively.

The friction reduction performance displayed in FIG. 1 show that the polymer, represented by Examples 3-5, significantly outperfoms typical hydrophobically modified polyelectrolytes (Example 8) and the natural polymer benchmark (guar). The composition shows similar friction reduction performance of a typical synthetic polyelectrolyte (Example 7), considering both the % friction reduction and speed of which the max friction reduction is reached. The uniqueness of the disclosed copolymers and compositions is demonstrated through their ability to perform both as a linear gel viscosifer as shown in Example 12 and 13 and a good friction reducer as shown in Example 14.

Example 15

High Brine Water Based Mud Evaluations by Hot Rolling Procedures

For testing in drilling mud formulations (Brine B and KCl muds), rheology was measured with a Fann 35 viscometer at 150° F., before and after hot rolling. Hot rolling is a process of aging at low shear, typically used to evaluate performance of drilling fluids, and their thermal stability by simulating circulation conditions. API 131301 "Recommended Practice for Field Testing Water-based Drilling Fluids" provides guidelines for testing across the industry so that all companies can compare their fluids and provide service based on common properties and methods. All of the hot rolling experiments described herein were performed for 16 continuous hours at 300° F. in high pressure stainless steel aging cells with 200 psi of nitrogen overhead pressure.

The drilling muds used were either 5.6 weight % KCl mud or a 12.5% NaCl mud (Brine B). The pH of each mud was adjusted to 9.5. Each polymer was added to the mud at 2.5 ppb (pounds per barrel) alongside Torq Free® HD at 12 lb/gal density. Viscosity was measured at 3 rpm (corresponding to 5 s$^{-1}$ shear rate) and 6 rpm (corresponding to 10 s$^{-1}$ shear rate) before hot rolling (BHR) or after hot rolling (AHR) at 300° F. The viscosities are reported as direct readings from the Fann 35 Viscometer. In addition to the viscosity, the yield point (YP) and plastic viscosity (PV) were calculated for each mixture before and after hot rolling.

The drilling mud formulations used are illustrated in Table 18 and 19.

TABLE 18

KCl Water Based Drilling Mud Formulation (WBMA)

| Composition | Weight % | Function | Mix time (min) |
|---|---|---|---|
| Tap Water | 57.00% | Carrier | |
| KCl | 2.93% | Shale Inhibitor | 3 |
| Sodium Thiosulfate | 0.41% | Antioxidant | 3 |
| Torq Free ® HD | 1.63% | Lubricant | 2 |
| Nanogel FLCA | 1.09% | Fluid Loss Control | 10 |

TABLE 18-continued

KCl Water Based Drilling Mud Formulation (WBMA)

| Composition | Weight % | Function | Mix time (min) |
|---|---|---|---|
| Copolymer in dry powder form | 0.41% | Viscosifier | 20 |
| Caustic - Adjust pH to 9.5 | Varies | pH Adjuster | 5 |
| Bactron K87 | 0.05% | Biocide | 2 |
| Calcium Carbonate | 3.26% | Bridging Agent | 5 |
| Barite API | 33.22% | Weighting Agent | 10 |
| Total | 100.00% | | 60 |

TABLE 19

Brine B Water Based Drilling Mud Formulation (WBMB)

| Component | Weight % | Function | Mix Time (min) |
|---|---|---|---|
| 9.1 pounds per thousand gallons (ppg) NaCl (12.34 wt. %) | 60.81% | Carrier | — |
| Sodium Thiosulfate | 0.40% | Antioxidant | 3 |
| Torq Free ® HD | 1.59% | Lubricant | 2 |
| Nanogel FLCA | 1.07% | Fluid Loss Control | 10 |
| Copolymer in dry powder form | 0.40% | Viscosifier | 20 |
| Caustic - Adjust pH to 9.5 | Varies | pH Adjuster | 5 |
| Bactron K87 | 0.05% | Biocide | 2 |
| Calcium Carbonate | 3.19% | Bridging Agent | 5 |
| Barite API | 32.50% | Weighting Agent | 10 |
| Total | 100.00% | | 57 |

Examples 3-6 in Hot Rolling Evaluations

Table 20 and 21 depict the viscosity for the copolymers and compositions, represented by Examples 3-6, in WBMA and WBMB at 3 RPM and 6 RPM before (BHR) and after hot rolling (AHR). The calculated yield point (YP) and plastic viscosity (PV) are also shown for each before and after hot rolling.

TABLE 20

| Sample | Viscosifier Conc (ppb) | 3 RPM | 6 RPM | PV | YP |
|---|---|---|---|---|---|
| Before Hot Rolling @300° F. in WBMB Rheology @ 150° F. | | | | | |
| Example 3 | 2.5 | 11 | 12 | 24 | 28 |
| Example 4 | 2.5 | 14 | 16 | 30 | 28 |
| Example 5 | 2.5 | 10 | 11 | 32 | 26 |
| Example 6 | 2.5 | 3.5 | 4.5 | 4 | 13 |
| After Hot Rolling @ 300° F. in WBMB Rheology @ 150° F. | | | | | |
| Example 3 | 2.5 | 12 | 14 | 35 | 28 |
| Example 4 | 2.5 | 17 | 19 | 38 | 40 |
| Example 5 | 2.5 | 14 | 16 | 27 | 51 |
| Example 6 | 2.5 | 4 | 6 | 51 | 8 |

TABLE 21

| Sample | Viscosifier Conc (ppb) | 3 RPM | 6 RPM | PV | YP |
|---|---|---|---|---|---|
| Before Hot Rolling @ 300° F. in WBMA Rheology @ 150° F. | | | | | |
| Example 3 | 2.5 | 14 | 17 | 13 | 45 |
| Example 4 | 2.5 | 28 | 31 | 14 | 74 |
| Example 5 | 2.5 | 17 | 21 | 38 | 22 |
| Example 6 | 2.5 | 4 | 4.5 | 42 | 10 |
| After Hot Rolling @ 300° F. in WBMA Rheology @ 150° F. | | | | | |
| Example 3 | 2.5 | 13 | 17 | 16 | 70 |
| Example 4 | 2.5 | 18 | 24 | 21 | 74 |
| Example 5 | 2.5 | 17 | 21 | 33 | 33 |
| Example 6 | 2.5 | 3 | 3 | 25 | 12 |

In general, Tables 20 and 21 illustrate that the polymers of Example 3-6 provide good thermal stability after hot rolling at 300° F. for 16 hours based on the drilling fluids retaining most of their viscosity as determined before the hot rolling treatment. The PV and YP changed some, but still remained in the desirable range relative to viscosity. Examples 3-5 performed best compared to Example 6 in both WBMA and WBMB due to higher low shear viscosity, indicating that polymers using the VBL9 polymerizable surfactant provide more desirable rheological characteristics in drilling fluids compared to when the VBL23 polymerizable surfactant is utilized. In many cases, the plastic viscosity (PV) was slightly too high when using a 2.5 lb/bbl (ppb) polymer concentration, suggesting that a balance between low shear rheology and PV must be found by reducing the polymer concentration, potentially to 2.0 ppb.

Example 16

Temperature and pH Stability Comparison

Examples 3 and 7 were subjected to pH stability tests at elevated temperatures to demonstrate the advantage of the disclosed copolymers and compositions over typical hydrophobically modified electrolytes in drilling and well stimulation fluids, particularly in fluids that spend a significant time at higher temperatures and higher pHs. Each powder polymer was fully dissolved in Brine B at 0.5% polymer concentration at pHs ranging from 6 to 10. In the case of Example 7, 650 ppm ethoxylated alcohol CAS# 78330-21-9 was added as described in Example 13 to assure full dissolution of Example 7. All polymer solutions were mixed at 800 RPM with a cage stirrer for 1-2 hours to assure full dissolution and then aged at 200° F. for 0 hour, 1 hour, and 2 hours. They were then cooled to room temperature and mixed again at 800 RPM with a cage stirrer for approximately 10 minutes immediately before rheological evaluation.

Figure 2:
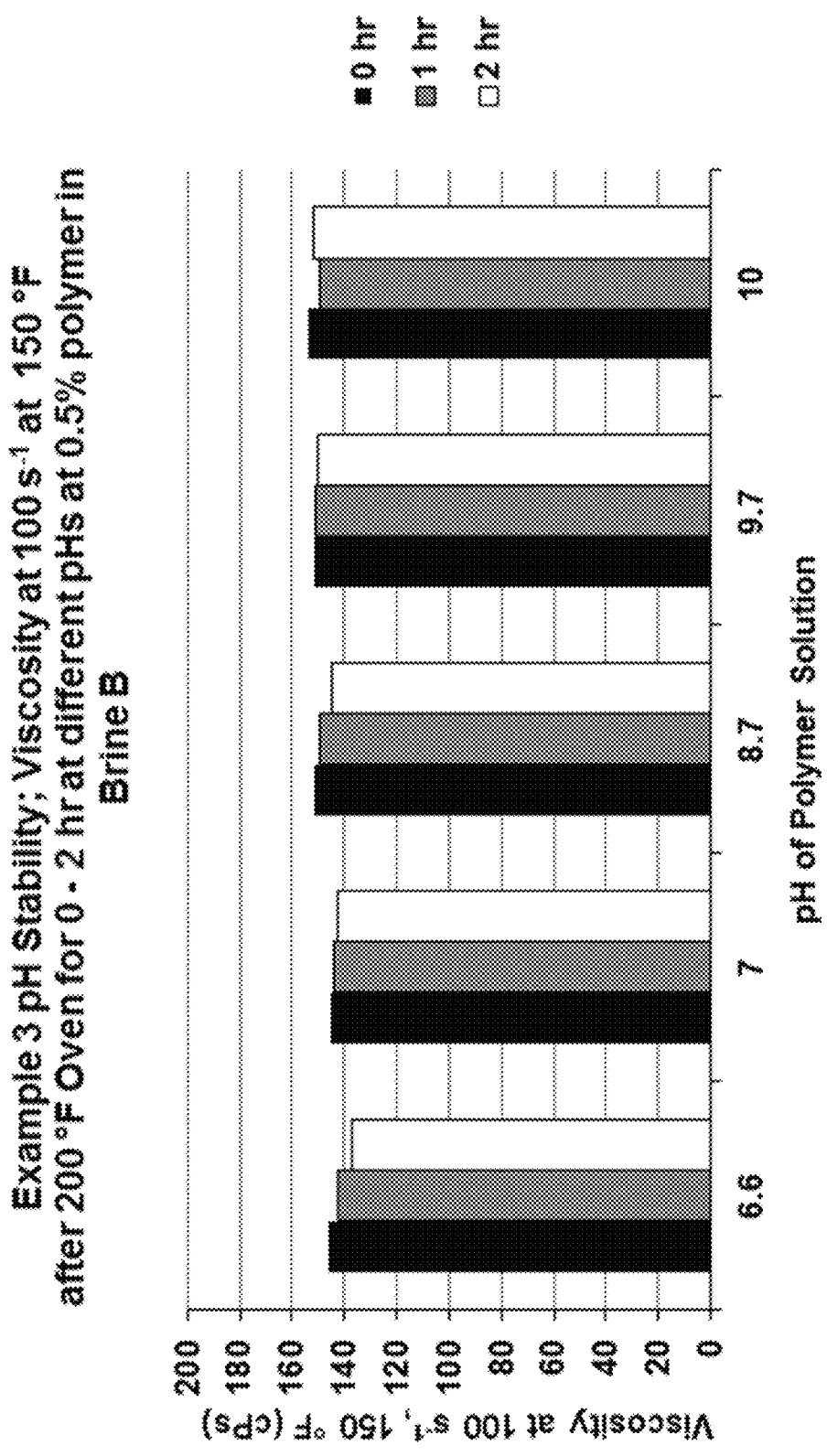
FIG. 2 shows a graph of the viscosity at 100 s$^{-1}$ and 150° F. at pH of 6.6, 7, 8.7, 9.7, and 10 of the Example 3 composition, formulated with 0.5% polymer in brine B, at 0, 1, and 2 hours of 200° F. heat treatment.
Figure 3:
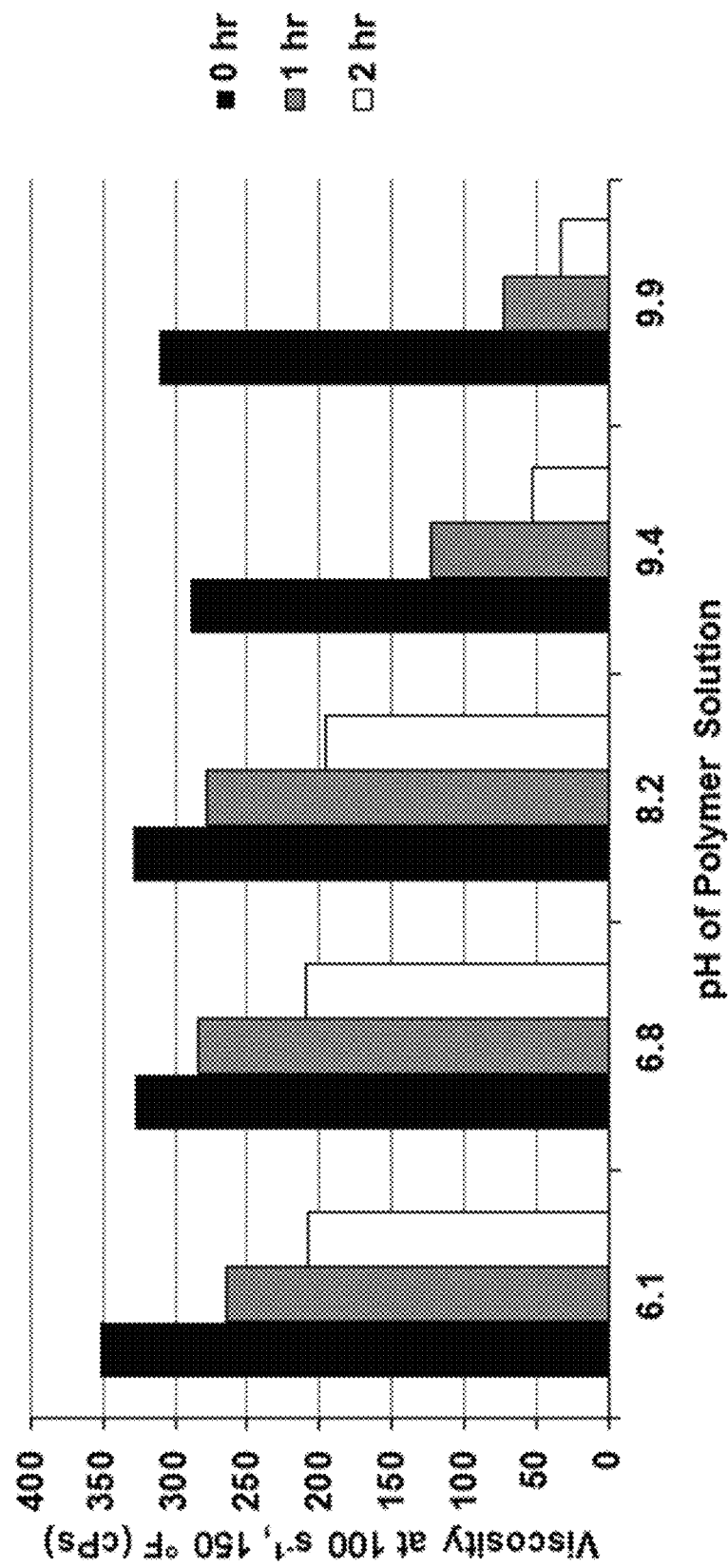
FIG. 3 shows a graph of the viscosity at 100 s$^{-1}$ and 150° F. at pH of 6.1, 6.8, 8.2, 9.4, and 9.9 of the Example 7 composition, formulated with 0.5% polymer in brine B, at 0, 1, and 2 hours of 200° F. heat treatment.

All rheology measurements were conducted using an Anton Paar MCR320 rheometer. The tests were conducted with a concentric cylinder fixture. Immediately after mixing as described above, the sample was transferred via pipet to the rheometer sample holder, heated to a steady 150° F., pre-sheared at 100 s$^{-1}$, 150° F. for 30 seconds, and then left undisturbed at 150° F. for 60 seconds before the data collection begins. The shear sweep experiments (effect of shear rate on viscosity) were performed with shear rate control from 0.1 to 1000 (10 data points/decade with 41 points total) at a constant temperature of 150° F. The results are shown in FIGS. 2 and 3 and demonstrate the composition, represented by Example 3, to be significantly more stable than typical hydrophobically modified polyelectrolytes, represented by Example 7, particularly at pHs greater than 8. The aging at 200° F. accelerates the hydrolysis of the ester connected hydrophobe from the polyelectrolyte backbone leading to loss of hydrophobic association between polymers, thus a loss of viscosity. Higher pH accelerates the hydrolysis even more. The Example 3 composition maintains its viscosity due to the higher thermal and pH stability of the ether linkage of the hydrophobe to the polyelectrolye backbone.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

The invention claimed is:

1. A copolymer comprising units derived from a nonionic monomer, an ionic monomer, and a surface-active monomer having the structure of Formula I:

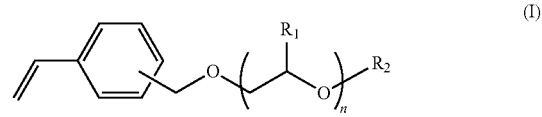

(I)

wherein n is from 1 to 60, $R_1$ is hydrogen, alkyl, or a combination thereof, and $R_2$ is a straight or branched $C_6$ to $C_{30}$ alkyl or a straight or branched $C_6$ to $C_{30}$ alkenyl, and wherein the copolymer is water-soluble and, when combined with an equal weight amount of hydrocarbon oil, provides equal to or greater than 40 cPs at 17 s$^{-1}$ within 7.5 minutes upon mixing into an 11.3% TDS brine at 25° C. at 0.3% copolymer concentration by weight; wherein the ionic monomer comprises acrylamido methylpropanesulfonic acid, acrylamido tertiary butyl sulfonic acid (ATBS), acrylic acid, methacrylic acid, 4-vinylbenzenesulfonic acid, a salt thereof, or a combination thereof;

wherein the nonionic monomer comprises acrylamide, methacrylamide, N,N-dimethylacrylamide, N,N-diethylacrylamide, N-isopropylacrylamide, N-vinylformamide, N-methyl-N-vinylacetamide, 1-vinyl-2-pyrrolidinone, N-tert-butylacrylamide, N-(hydroxymethyl)acrylamide, or a combination thereof; and the copolymer is derived from a reaction solution comprising from about 50 mole percent to about 85 mole percent of the nonionic monomer, from about 15 mole percent to about 50 mole percent of the ionic monomer, and from about 0.01 mole percent to about 0.5 mole percent of the surface-active monomer having the structure of Formula I, based on the total moles of the nonionic monomer, ionic monomer, and the surface-active monomer having the structure of formula I.

2. The copolymer of claim 1, wherein the nonionic monomer comprises acrylamide, methacrylamide, N,N-dimethylacrylamide, or a combination thereof.

3. The copolymer of claim 1, wherein the nonionic monomer comprises acrylamide.

4. The copolymer of claim 1, wherein the ionic monomer comprises 2-acrylamido-2-methyl-1-propanesulfonic acid, or a salt thereof.

5. The copolymer of claim 1, consisting essentially of units derived from the nonionic monomer, the ionic monomer, and the surface-active monomer having the structure of Formula I.

6. The copolymer of claim 1, wherein n is from 4 to 30.

7. The copolymer of claim 1, wherein n is from 6 to 24.

8. The copolymer of claim 4, wherein n is from 6 to 12.

9. The copolymer of claim 1, wherein $R_2$ is a straight or branched $C_6$ to $C_{30}$ alkyl.

10. The copolymer of claim 8, wherein $R_2$ is a straight or branched $C_{10}$ to $C_{16}$ alkyl.

11. The copolymer of claim 1, wherein the surface-active monomer of Formula I has the structure of Formula II or Formula III:

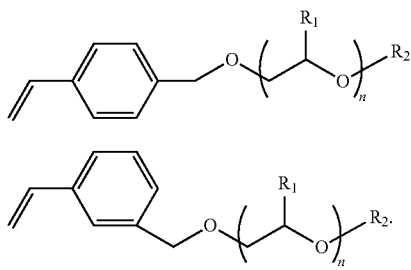

12. The copolymer of claim 1, wherein $R_1$ is hydrogen, methyl, ethyl, propyl, or a combination thereof.

13. The copolymer of claim 1, wherein Ri is hydrogen, methyl, or a combination thereof.

14. The copolymer of claim 12, wherein Ri is hydrogen.

15. A composition comprising a surfactant and the copolymer of claim 1.

16. A composition comprising a hydrocarbon oil, an oil-soluble rheology modifier, and the copolymer of claim 1.

17. A method of synthesizing the copolymer of claim 1 comprising reacting the nonionic monomer and ionic monomer with the surface-active monomer having the structure of Formula I in the presence of a non-polymerizable surfactant.

18. A method of increasing the viscosity of an aqueous solution comprising contacting the copolymer of claim 1 with the aqueous solution, thereby increasing the viscosity of the aqueous solution.

19. A method of reducing drag of an aqueous solution comprising contacting the copolymer of claim 1 with the aqueous solution, thereby reducing drag of the aqueous solution.

20. The copoymer of claim 1, wherein the copolymer is derived from a reaction solution comprising from about 70 mole percent to about 85 mole percent of the nonionic monomer, from about 15 mole percent to about 30 mole percent of the ionic monomer, and from about 0.01 mole percent to about 0.3 mole percent of the surface-active monomer having the structure of Formula I, based on the total moles of the nonionic monomer, ionic monomer, and the surface-active monomer having the structure of formula I.

* * * * *

UNITED STATES PATENT AND TRADEMARK OFFICE
CERTIFICATE OF CORRECTION

| | |
|---|---|
| PATENT NO. | : 11,332,563 B2 |
| APPLICATION NO. | : 16/523730 |
| DATED | : May 17, 2022 |
| INVENTOR(S) | : Paul Joseph Zinn et al. |

It is certified that error appears in the above-identified patent and that said Letters Patent is hereby corrected as shown below:

In the Claims

Column 34, Claim 13, Line 3: "Ri"
Should read -- $R_1$ --

Column 34, Claim 14, Line 5: "Ri"
Should read -- $R_1$ --

Column 34, Claim 20, Line 25: "copoymer"
Should read -- copolymer --

Signed and Sealed this
Twenty-fifth Day of April, 2023

Katherine Kelly Vidal
*Director of the United States Patent and Trademark Office*